(12) United States Patent
Bock et al.

(10) Patent No.: US 11,826,861 B1
(45) Date of Patent: Nov. 28, 2023

(54) JOINING SYSTEMS, CLAMPING FIXTURES, AND RELATED SYSTEMS AND METHODS

(71) Applicant: Sion Power Corporation, Tucson, AZ (US)

(72) Inventors: James Anthony Bock, Oro Valley, AZ (US); Jared M. Jennings, Tucson, AZ (US); Aaron Johnson, Tucson, AZ (US)

(73) Assignee: Sion Power Corporation, Tucson, AZ (US)

( * ) Notice: Subject to any disclaimer, the term of this patent is extended or adjusted under 35 U.S.C. 154(b) by 0 days.

(21) Appl. No.: 17/398,186

(22) Filed: Aug. 10, 2021

Related U.S. Application Data

(60) Provisional application No. 63/064,544, filed on Aug. 12, 2020.

(51) Int. Cl.
*B23K 1/00* (2006.01)
*H01M 4/00* (2006.01)
*B23K 37/04* (2006.01)
*H01M 4/02* (2006.01)
*H01M 4/04* (2006.01)
*B23K 101/42* (2006.01)

(52) U.S. Cl.
CPC ........... *B23K 37/0408* (2013.01); *H01M 4/02* (2013.01); *H01M 4/04* (2013.01); *B23K 2101/42* (2018.08)

(58) Field of Classification Search
CPC ....... B23K 37/0408–0452; B23K 2101/36–42; B23K 20/004; B23K 20/005; B23K 20/007; B23K 37/04–0461

USPC ... 228/4.5, 180.5, 904, 212–213, 49.5, 44.7, 228/44.3

See application file for complete search history.

(56) References Cited

U.S. PATENT DOCUMENTS

| | | | | |
|---|---|---|---|---|
| 2,422,934 A | * | 6/1947 | Stieglitz | H01R 4/32 439/814 |
| 4,583,676 A | * | 4/1986 | Pena | H01L 24/78 228/232 |
| 4,836,792 A | * | 6/1989 | Glover | H01R 12/58 439/876 |
| 5,030,107 A | * | 7/1991 | Moon | H01R 12/7076 439/62 |
| 5,035,034 A | * | 7/1991 | Cotney | H01L 24/78 228/180.5 |
| 5,037,327 A | * | 8/1991 | Van Woensel | H01R 12/727 439/571 |
| 5,126,521 A | * | 6/1992 | McGaffigan | H01R 4/723 219/616 |
| 5,197,652 A | * | 3/1993 | Yamazaki | H01L 21/6835 269/903 |
| 5,199,886 A | * | 4/1993 | Patterson | H01R 12/727 439/79 |
| 5,264,002 A | * | 11/1993 | Egashira | H01L 21/67706 29/827 |

(Continued)

FOREIGN PATENT DOCUMENTS

| | | | | |
|---|---|---|---|---|
| CA | 2941992 A1 | * | 5/2017 | ............. B23K 10/02 |
| CN | 1832242 A | * | 9/2006 | ........ H01M 10/0436 |

(Continued)

*Primary Examiner* — Kiley S Stoner
(74) *Attorney, Agent, or Firm* — Wolf, Greenfield & Sacks, P.C.

(57) ABSTRACT

Joining systems, clamping fixtures, and related systems and methods are generally described.

20 Claims, 9 Drawing Sheets

SECTION B-B

(56) References Cited

U.S. PATENT DOCUMENTS

| | | | |
|---|---|---|---|
| 5,307,978 A * | 5/1994 | Ricketson | H01L 21/67144 228/49.1 |
| 5,322,207 A * | 6/1994 | Fogal | H01L 24/97 228/180.5 |
| 5,356,313 A * | 10/1994 | Niwa | H01R 12/716 439/567 |
| 5,611,478 A * | 3/1997 | Asanasavest | H01L 21/4853 228/110.1 |
| 5,622,304 A * | 4/1997 | Sato | H01L 24/79 228/222 |
| 5,648,187 A | 7/1997 | Skotheim | |
| 5,796,161 A * | 8/1998 | Moon | H01L 24/78 228/49.1 |
| 5,826,778 A * | 10/1998 | Sato | H01L 24/86 257/E21.519 |
| 5,890,644 A * | 4/1999 | Ball | H01L 24/85 257/E21.519 |
| 5,899,760 A * | 5/1999 | Ho | H05K 13/0409 439/135 |
| 5,904,288 A * | 5/1999 | Humphrey | B23K 20/005 228/180.5 |
| 5,919,587 A | 7/1999 | Mukherjee et al. | |
| 5,954,842 A * | 9/1999 | Fogal | H01L 24/05 228/110.1 |
| 5,961,672 A | 10/1999 | Skotheim et al. | |
| 6,031,216 A * | 2/2000 | Singh | B23K 20/007 219/616 |
| 6,047,468 A * | 4/2000 | Fogal | H01L 21/4825 228/110.1 |
| 6,059,606 A * | 5/2000 | Okuyama | H01R 13/6594 439/564 |
| 6,062,459 A * | 5/2000 | Sabyeying | H01L 24/78 269/903 |
| 6,068,174 A * | 5/2000 | Ball | H01L 24/85 228/4.5 |
| 6,081,996 A * | 7/2000 | Kruppa | H05K 3/4046 439/82 |
| 6,189,762 B1 * | 2/2001 | Ball | H01L 24/85 228/49.5 |
| 6,238,821 B1 | 5/2001 | Mukherjee et al. | |
| 6,267,287 B1 * | 7/2001 | Ball | B23K 37/04 228/180.5 |
| 6,352,191 B1 * | 3/2002 | Evers | B23K 20/004 269/316 |
| 6,607,121 B2 * | 8/2003 | Fogal | H01L 24/78 228/49.5 |
| 6,733,924 B1 | 5/2004 | Skotheim et al. | |
| 6,797,428 B1 | 9/2004 | Skotheim et al. | |
| 6,936,381 B2 | 8/2005 | Skotheim et al. | |
| 6,984,879 B2 * | 1/2006 | Kim | H01L 22/20 257/676 |
| 7,247,408 B2 | 7/2007 | Skotheim et al. | |
| 7,688,075 B2 | 3/2010 | Kelley et al. | |
| 7,771,870 B2 | 8/2010 | Affinito et al. | |
| 7,785,730 B2 | 8/2010 | Affinito et al. | |
| 7,939,198 B2 | 5/2011 | Mukherjee et al. | |
| 8,076,024 B2 | 12/2011 | Affinito et al. | |
| 8,084,102 B2 | 12/2011 | Affinito | |
| 8,087,309 B2 | 1/2012 | Kelley et al. | |
| 8,105,717 B2 | 1/2012 | Skotheim et al. | |
| 8,197,971 B2 | 6/2012 | Skotheim et al. | |
| 8,264,205 B2 | 9/2012 | Kopera | |
| 8,338,034 B2 | 12/2012 | Affinito et al. | |
| 8,415,054 B2 | 4/2013 | Skotheim et al. | |
| 8,603,680 B2 | 12/2013 | Affinito et al. | |
| 8,617,748 B2 | 12/2013 | Mikhaylik et al. | |
| 8,623,557 B2 | 1/2014 | Skotheim et al. | |
| 8,728,661 B2 | 5/2014 | Skotheim et al. | |
| 8,753,771 B2 | 6/2014 | Skotheim et al. | |
| 8,871,387 B2 | 10/2014 | Wang et al. | |
| 8,936,870 B2 | 1/2015 | Affinito et al. | |
| 8,968,928 B2 | 3/2015 | Wang et al. | |
| 9,005,311 B2 | 4/2015 | Safont-Sempere et al. | |
| 9,005,809 B2 | 4/2015 | Wilkening et al. | |
| 9,034,421 B2 | 5/2015 | Mikhaylik et al. | |
| 9,040,197 B2 | 5/2015 | Affinito et al. | |
| 9,040,201 B2 | 5/2015 | Affinito et al. | |
| 9,065,149 B2 | 6/2015 | Skotheim et al. | |
| 9,077,041 B2 | 7/2015 | Burnside et al. | |
| 9,105,938 B2 | 8/2015 | Scordilis-Kelley et al. | |
| 9,214,678 B2 | 12/2015 | Mikhaylik | |
| 9,397,342 B2 | 7/2016 | Skotheim et al. | |
| 9,419,274 B2 | 8/2016 | Wilkening et al. | |
| 9,490,478 B2 | 11/2016 | Mikhaylik et al. | |
| 9,531,009 B2 | 12/2016 | Kumaresan et al. | |
| 9,548,492 B2 | 1/2017 | Affinito et al. | |
| 9,559,348 B2 | 1/2017 | Kumaresan et al. | |
| 9,577,243 B2 | 2/2017 | Schmidt et al. | |
| 9,577,267 B2 | 2/2017 | Scordilis-Kelley et al. | |
| 9,653,735 B2 | 5/2017 | Skotheim et al. | |
| 9,653,750 B2 | 5/2017 | Laramie et al. | |
| 9,711,784 B2 | 7/2017 | Kelley et al. | |
| 9,728,768 B2 | 8/2017 | Mikhaylik et al. | |
| 9,735,411 B2 | 8/2017 | Viner et al. | |
| 9,755,268 B2 | 9/2017 | Fleischmann et al. | |
| 9,780,404 B2 | 10/2017 | Scordilis-Kelley et al. | |
| 9,825,328 B2 | 11/2017 | Du et al. | |
| 9,853,287 B2 | 12/2017 | Mikhaylik et al. | |
| 9,947,963 B2 | 4/2018 | Du et al. | |
| 9,994,959 B2 | 6/2018 | Laramie et al. | |
| 9,994,960 B2 | 6/2018 | Laramie et al. | |
| 10,020,479 B2 | 7/2018 | Mikhaylik et al. | |
| 10,020,512 B2 | 7/2018 | Gronwald et al. | |
| 10,050,308 B2 | 8/2018 | Liao et al. | |
| 10,069,135 B2 | 9/2018 | Fleischmann et al. | |
| 10,069,146 B2 | 9/2018 | Skotheim et al. | |
| 10,122,043 B2 | 11/2018 | Du et al. | |
| 10,243,202 B2 | 3/2019 | Fleischmann et al. | |
| 10,312,545 B2 | 6/2019 | Scordilis-Kelley et al. | |
| 10,319,988 B2 | 6/2019 | Kelley et al. | |
| 10,320,027 B2 | 6/2019 | Scordilis-Kelley et al. | |
| 10,320,031 B2 | 6/2019 | Mikhaylik et al. | |
| 10,333,134 B2 | 6/2019 | Mikhaylik et al. | |
| 10,333,149 B2 | 6/2019 | Affinito et al. | |
| 10,388,987 B2 | 8/2019 | Du et al. | |
| 10,461,333 B2 | 10/2019 | Mikhaylik et al. | |
| 10,461,372 B2 | 10/2019 | Laramie et al. | |
| 10,490,796 B2 | 11/2019 | Laramie et al. | |
| 10,535,902 B2 | 1/2020 | Laramie et al. | |
| 10,541,448 B2 | 1/2020 | Mikhaylik et al. | |
| 10,553,893 B2 | 2/2020 | Laramie et al. | |
| 10,573,869 B2 | 2/2020 | Mikhaylik et al. | |
| 10,608,278 B2 | 3/2020 | Liao et al. | |
| 10,629,947 B2 | 4/2020 | Affinito et al. | |
| 10,629,954 B2 | 4/2020 | Mikhaylik et al. | |
| 10,720,648 B2 | 7/2020 | Quero-Mieres et al. | |
| 10,847,833 B2 | 11/2020 | Bunte et al. | |
| 10,862,105 B2 | 12/2020 | Gronwald et al. | |
| 10,868,306 B2 | 12/2020 | Mudalige et al. | |
| 10,868,401 B1 * | 12/2020 | Johnson | H01R 43/0263 |
| 10,879,527 B2 | 12/2020 | Laramie et al. | |
| 10,944,094 B2 | 3/2021 | Liao et al. | |
| 10,965,130 B2 | 3/2021 | Mikhaylik et al. | |
| 10,991,925 B2 | 4/2021 | Wang et al. | |
| 11,038,178 B2 | 6/2021 | Liao et al. | |
| 11,041,248 B2 | 6/2021 | Laramie et al. | |
| 11,056,728 B2 | 7/2021 | Mikhaylik et al. | |
| 11,088,395 B2 | 8/2021 | Mikhaylik et al. | |
| 11,108,076 B2 | 8/2021 | Scordilis-Kelley et al. | |
| 11,108,077 B2 | 8/2021 | Scordilis-Kelley et al. | |
| 11,114,716 B1 * | 9/2021 | Chen | H01M 50/209 |
| 11,121,397 B2 | 9/2021 | Scordilis-Kelley et al. | |
| 11,305,366 B2 * | 4/2022 | Peters | B23K 26/0006 |
| 11,480,947 B2 * | 10/2022 | Iriguchi | G05B 19/4099 |
| 2001/0007084 A1 * | 7/2001 | Koo | H01L 24/78 700/121 |
| 2001/0053244 A1 * | 12/2001 | Kim | H01L 22/20 257/E23.179 |
| 2002/0066775 A1 * | 6/2002 | Evers | H01L 24/85 228/180.5 |
| 2003/0057252 A1 * | 3/2003 | Ball | H01L 24/85 257/E21.519 |

(56) References Cited

U.S. PATENT DOCUMENTS

| | | | |
|---|---|---|---|
| 2004/0026486 A1* | 2/2004 | Evers | B23K 20/004 228/180.5 |
| 2004/0065720 A1* | 4/2004 | Wong | H01L 24/78 228/180.5 |
| 2005/0109823 A1* | 5/2005 | Gruber | B23K 3/053 228/256 |
| 2005/0112949 A1* | 5/2005 | Huang | H01R 13/41 439/637 |
| 2005/0161488 A1* | 7/2005 | Duan | H01L 24/78 228/42 |
| 2005/0196672 A1 | 9/2005 | Mukherjee et al. | |
| 2005/0263566 A1* | 12/2005 | Su | B23K 37/0426 228/180.5 |
| 2006/0011701 A1* | 1/2006 | Duan | B23K 37/0408 228/4.5 |
| 2006/0035492 A1* | 2/2006 | Sekido | H05K 1/0287 439/100 |
| 2006/0046531 A1* | 3/2006 | Sinclair | G01R 1/0466 439/70 |
| 2006/0115579 A1 | 6/2006 | Mukherjee et al. | |
| 2007/0149015 A1* | 6/2007 | Minoura | H01R 13/111 439/157 |
| 2007/0202726 A1* | 8/2007 | Lee | H01R 9/0518 439/188 |
| 2007/0221265 A1 | 9/2007 | Affinito et al. | |
| 2007/0259577 A1* | 11/2007 | Stromiedel | H01R 12/716 439/886 |
| 2008/0078572 A1* | 4/2008 | Watanabe | H05K 3/4046 174/262 |
| 2008/0272179 A1* | 11/2008 | Kwan | B23K 20/004 228/59 |
| 2008/0318128 A1 | 12/2008 | Simoneau et al. | |
| 2009/0035646 A1 | 2/2009 | Mikhaylik et al. | |
| 2009/0055110 A1 | 2/2009 | Kelley et al. | |
| 2010/0239914 A1 | 9/2010 | Mikhaylik et al. | |
| 2011/0006738 A1 | 1/2011 | Mikhaylik et al. | |
| 2011/0014524 A1 | 1/2011 | Skotheim et al. | |
| 2011/0068001 A1 | 3/2011 | Affinito et al. | |
| 2011/0070491 A1 | 3/2011 | Campbell et al. | |
| 2011/0070494 A1 | 3/2011 | Campbell et al. | |
| 2011/0076560 A1 | 3/2011 | Scordilis-Kelley et al. | |
| 2011/0159376 A1 | 6/2011 | Skotheim et al. | |
| 2011/0165471 A9 | 7/2011 | Skotheim et al. | |
| 2011/0206992 A1 | 8/2011 | Campbell et al. | |
| 2011/0256450 A1 | 10/2011 | Campbell et al. | |
| 2012/0048729 A1 | 3/2012 | Mikhaylik et al. | |
| 2012/0052339 A1 | 3/2012 | Mikhaylik et al. | |
| 2012/0070746 A1 | 3/2012 | Mikhaylik et al. | |
| 2012/0082872 A1 | 4/2012 | Schmidt et al. | |
| 2012/0082901 A1 | 4/2012 | Schmidt et al. | |
| 2012/0100761 A1* | 4/2012 | Gro e | H01M 50/528 156/50 |
| 2012/0196484 A1* | 8/2012 | Zieder | H01R 13/743 439/638 |
| 2013/0207596 A1* | 8/2013 | Zichner | H01M 10/615 29/623.1 |
| 2013/0316072 A1 | 11/2013 | Scordilis-Kelley et al. | |
| 2014/0014708 A1* | 1/2014 | Chuang | H01L 24/85 228/4.5 |
| 2014/0073206 A1* | 3/2014 | Golko | H01R 13/02 29/874 |
| 2014/0127950 A1* | 5/2014 | Fang | H01R 13/405 439/676 |
| 2014/0272594 A1 | 9/2014 | Safont Sempere et al. | |
| 2014/0272595 A1 | 9/2014 | Cristadoro et al. | |
| 2015/0162586 A1 | 6/2015 | Fleischmann et al. | |
| 2015/0188194 A1 | 7/2015 | Mikhaylik et al. | |
| 2015/0287986 A1 | 10/2015 | Affinito et al. | |
| 2015/0343572 A1* | 12/2015 | Merto | H01L 24/85 228/44.7 |
| 2016/0118638 A1 | 4/2016 | Gronwald et al. | |
| 2016/0118651 A1 | 4/2016 | Kovalev et al. | |
| 2017/0141385 A1 | 5/2017 | Scordilis-Kelley et al. | |
| 2017/0141402 A1 | 5/2017 | Affinito et al. | |
| 2017/0151621 A1* | 6/2017 | Klegin | B23K 9/092 |
| 2018/0006303 A1 | 1/2018 | Mikhaylik et al. | |
| 2018/0254516 A1 | 9/2018 | Han et al. | |
| 2018/0261820 A1 | 9/2018 | Liao et al. | |
| 2018/0301697 A1 | 10/2018 | Affinito et al. | |
| 2018/0351148 A1 | 12/2018 | Schneider et al. | |
| 2018/0354054 A1* | 12/2018 | Barhorst | B21C 37/045 |
| 2018/0375155 A1 | 12/2018 | Liao et al. | |
| 2019/0006699 A1 | 1/2019 | Jones et al. | |
| 2019/0088958 A1 | 3/2019 | Viner et al. | |
| 2019/0099769 A1* | 4/2019 | Holverson | B05B 12/18 |
| 2019/0184486 A1* | 6/2019 | Flamm | B22F 12/22 |
| 2019/0229323 A1 | 7/2019 | Mikhaylik et al. | |
| 2019/0267632 A1 | 8/2019 | Affinito et al. | |
| 2019/0348672 A1 | 11/2019 | Wang et al. | |
| 2020/0044460 A1 | 2/2020 | Mikhaylik et al. | |
| 2020/0099108 A1 | 3/2020 | Laramie et al. | |
| 2020/0119324 A1 | 4/2020 | Laramie et al. | |
| 2020/0185764 A1 | 6/2020 | Liao et al. | |
| 2020/0194822 A1 | 6/2020 | Laramie et al. | |
| 2020/0220146 A1 | 7/2020 | Laramie et al. | |
| 2020/0220149 A1 | 7/2020 | Laramie et al. | |
| 2020/0220197 A1 | 7/2020 | Laramie et al. | |
| 2020/0220205 A1 | 7/2020 | Affinito et al. | |
| 2020/0350631 A1 | 11/2020 | Mikhaylik et al. | |
| 2020/0373551 A1 | 11/2020 | Milobar et al. | |
| 2020/0373578 A1 | 11/2020 | Wang et al. | |
| 2020/0395585 A1 | 12/2020 | Laramie et al. | |
| 2021/0057753 A1 | 2/2021 | Viner et al. | |
| 2021/0135297 A1 | 5/2021 | Mikhaylik et al. | |
| 2021/0135320 A1* | 5/2021 | Murata | H01M 50/533 |
| 2021/0138673 A1 | 5/2021 | Shannon et al. | |
| 2021/0151817 A1 | 5/2021 | Jennings et al. | |
| 2021/0151830 A1 | 5/2021 | Shayan et al. | |
| 2021/0151839 A1 | 5/2021 | Niedzwiecki et al. | |
| 2021/0193984 A1 | 6/2021 | Laramie et al. | |
| 2021/0193985 A1 | 6/2021 | Laramie et al. | |
| 2021/0193996 A1 | 6/2021 | Laramie et al. | |
| 2021/0194069 A1 | 6/2021 | Hamblin et al. | |
| 2021/0218243 A1 | 7/2021 | Hamblin et al. | |
| 2021/0249651 A1 | 8/2021 | Laramie et al. | |
| 2021/0265610 A1 | 8/2021 | Liao et al. | |
| 2021/0305199 A1* | 9/2021 | Xu | H01L 24/85 |
| 2021/0408607 A1* | 12/2021 | Saito | H01M 10/0525 |

FOREIGN PATENT DOCUMENTS

| | | | | |
|---|---|---|---|---|
| CN | 101427359 A | * | 5/2009 | B23K 20/004 |
| CN | 102534168 A | * | 7/2012 | |
| CN | 106695197 B | * | 8/2018 | B23K 37/00 |
| CN | 207818749 U | * | 9/2018 | |
| CN | 108723669 A | * | 11/2018 | B23K 37/0443 |
| CN | 107042347 B | * | 3/2019 | |
| CN | 111230282 A | * | 6/2020 | B23K 20/122 |
| CN | 106058128 B | * | 1/2021 | H01M 50/502 |
| CN | 115747538 A | * | 3/2023 | |
| DE | 102017205360 B3 | * | 7/2018 | H01M 50/502 |
| DE | 102019130584 A1 | * | 5/2020 | B23K 26/22 |
| EP | 3495083 A1 | * | 6/2019 | B22F 10/20 |
| GB | 2304456 A | * | 3/1997 | H01L 21/67144 |
| JP | 56142646 A | * | 11/1981 | |
| JP | 01095527 A | * | 4/1989 | H01L 24/78 |
| JP | 02137239 A | * | 5/1990 | |
| JP | 04061773 A | * | 2/1992 | |
| JP | H11302817 A | * | 11/1999 | |
| JP | 2007288093 A | * | 11/2007 | B23K 20/004 |
| KR | 101601232 B1 | * | 3/2016 | |
| WO | WO-9423474 A1 | * | 10/1994 | B23K 20/004 |
| WO | WO-2007123026 A1 | * | 11/2007 | B23K 20/004 |
| WO | WO-2008103263 A2 | * | 8/2008 | B23K 1/018 |
| WO | WO 2009/017726 A1 | | 2/2009 | |
| WO | WO 2009/042071 A2 | | 4/2009 | |
| WO | WO 2009/054987 A1 | | 4/2009 | |
| WO | WO 2009/089018 A2 | | 7/2009 | |
| WO | WO-2009152066 A2 | * | 12/2009 | B23K 20/007 |
| WO | WO-2014171269 A1 | * | 10/2014 | B23K 35/0255 |
| WO | WO-2016021251 A1 | * | 2/2016 | B23K 20/005 |
| WO | WO-2018012235 A1 | * | 1/2018 | B23K 1/0008 |

(56) References Cited

FOREIGN PATENT DOCUMENTS

| WO | WO-2020215633 A1 | * | 10/2020 |
|----|------------------|---|---------|
| WO | WO 2020/237015 A1 | | 11/2020 |
| WO | WO 2020/257414 A1 | | 12/2020 |

* cited by examiner

SECTION B-B

SECTION B-B

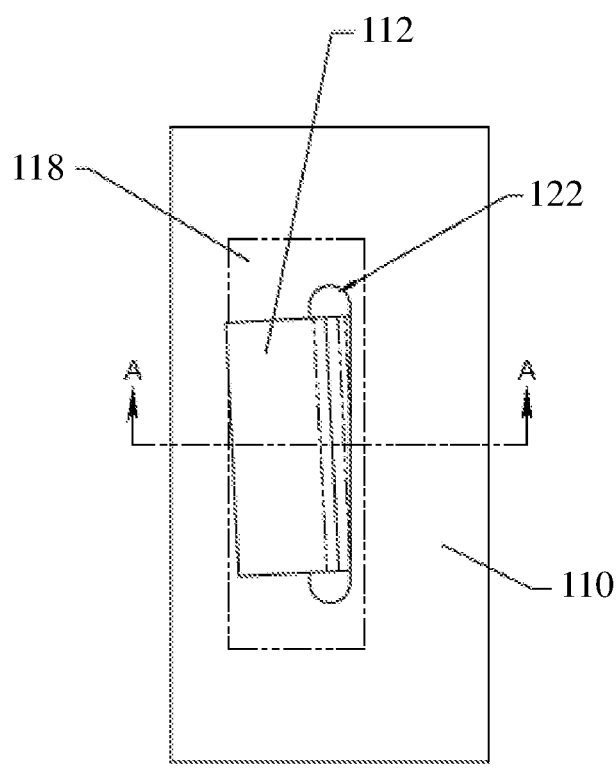
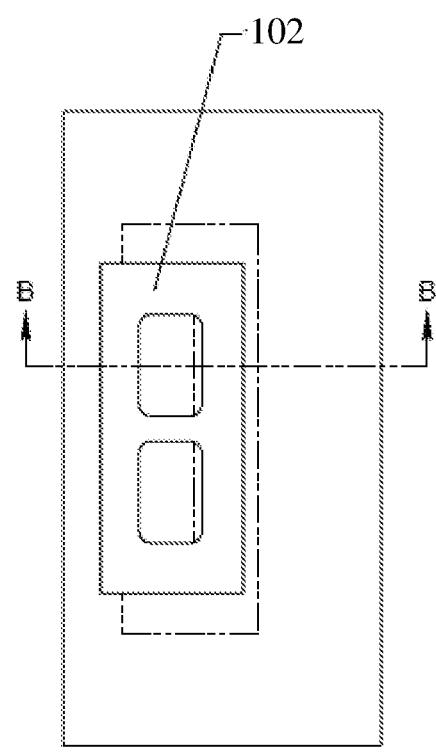
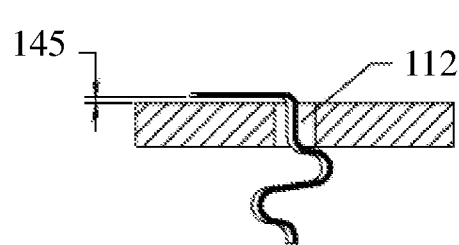
SECTION A-A
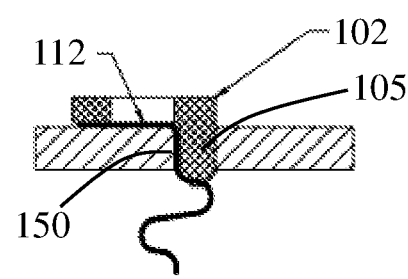
SECTION B-B
*FIG. 1D*  *FIG. 1E*

SECTION A-A

SECTION B-B

JOINING SYSTEMS, CLAMPING FIXTURES, AND RELATED SYSTEMS AND METHODS

RELATED APPLICATIONS

This application claims priority under 35 U.S.C. § 119(e) to U.S. Provisional Patent Application No. 63/064,544, filed Aug. 12, 2020, and entitled "Joining Systems, Clamping Fixtures, and Related Systems and Methods," which is incorporated herein by reference in its entirety for all purposes.

TECHNICAL FIELD

Joining systems, clamping fixtures, and related systems and methods are generally described.

SUMMARY

Joining systems, clamping fixtures, and related systems and methods are generally described. In certain embodiments, the joining systems and clamping fixtures can be used to perform thermal joining of materials, such as metal-containing materials. The subject matter of the present invention involves, in some cases, interrelated products, alternative solutions to a particular problem, and/or a plurality of different uses of one or more systems and/or articles.

In one aspect, joining systems are provided. In some embodiments, the joining system comprises a first material; a second material; and a clamping fixture comprising an aperture extending through the clamping fixture, wherein: the aperture is disposed against a first surface of the first material, the second material is disposed against a second surface of the first material opposite the first surface at a location at least partially aligned with the aperture, and the clamping fixture is configured to compress the first material against the second material.

In certain embodiments, the joining system comprises a clamping fixture comprising an aperture extending through the clamping fixture; and a substrate, wherein the clamping fixture and substrate include one or more connections configured to selectively attach the clamping fixture to the substrate and compress two or more materials between the clamping fixture and substrate such that the two or more materials are at least partially aligned with the aperture.

The joining system comprises, in some embodiments, a flexible electronically conductive tab; a printed circuit board (PCB) comprising an electronically conductive surface; and a clamping fixture comprising an aperture extending through the clamping fixture, wherein: the aperture is disposed against a first surface of the flexible electronically conductive tab, the PCB is disposed against a second surface of the flexible electronically conductive tab opposite the first surface at a location at least partially aligned with the aperture, and the clamping fixture is configured to compress the flexible electronically conductive tab against the PCB.

In one aspect, thermal joining methods are described. In accordance with some embodiments, a method of thermally joining two materials comprises arranging a clamping fixture over a first material and a second material such that the clamping fixture compresses the first material against the second material; and thermally joining the first material and the second material by heating the first material through an aperture extending from a first surface of the clamping fixture to a second surface of the clamping fixture opposite the first surface.

In accordance with certain embodiments, a method of thermally joining a flexible electronically conductive tab and a PCB comprises arranging a clamping fixture over a flexible electronically conductive tab and a PCB, the PCB comprising an electronically conductive surface, such that the clamping fixture compresses the flexible electronically conductive tab against the conductive surface of the PCB; and thermally joining the flexible electronically conductive tab to the conductive surface of the PCB by heating the flexible electronically conductive tab through an aperture extending from a first surface of the clamping fixture to a second surface of the clamping fixture opposite the first surface.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale unless otherwise indicated. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures:

FIG. 1D shows top view and cross-sectional illustrations of a tab inserted through an aperture of a substrate in the absence of a clamping fixture;

FIG. 1E shows top view and cross-sectional illustrations of a tab inserted through an aperture of a substrate when a clamping fixture is in place, in accordance with certain embodiments;

DETAILED DESCRIPTION

Joining systems, clamping fixtures, and related systems and methods are generally described. In some embodiments, the clamping fixtures can be used to apply a compressive force between first and second materials that are to be thermally joined (e.g., via welding, brazing, soldering, or any other thermal joining process). Application of such compressive force can increase the amount of contact between the materials that are to be joined prior to and/or during the thermal joining process, which can lead to a reduction in voids at the joined interface and a more efficient electrical connection between the joined materials.

The clamping fixture can include at least one aperture that provides access to underlying material that is to be joined. The presence of the aperture may, for example, allow a source of thermal energy to apply heat to at least one material that is to be joined while the clamping fixture maintains compression between the materials that are to be joined.

In certain embodiments, the clamping fixture can be connected to an underlying substrate, such that the materials that are to be joined are positioned between the clamping fixture and the underlying substrate. In addition to enhancing the amount of compressive force that may be applied by the clamping fixture to the materials that are to be thermally joined, connecting the clamping fixture to the substrate may allow for improved alignment of the materials that are to be thermally joined.

Figure 1A:
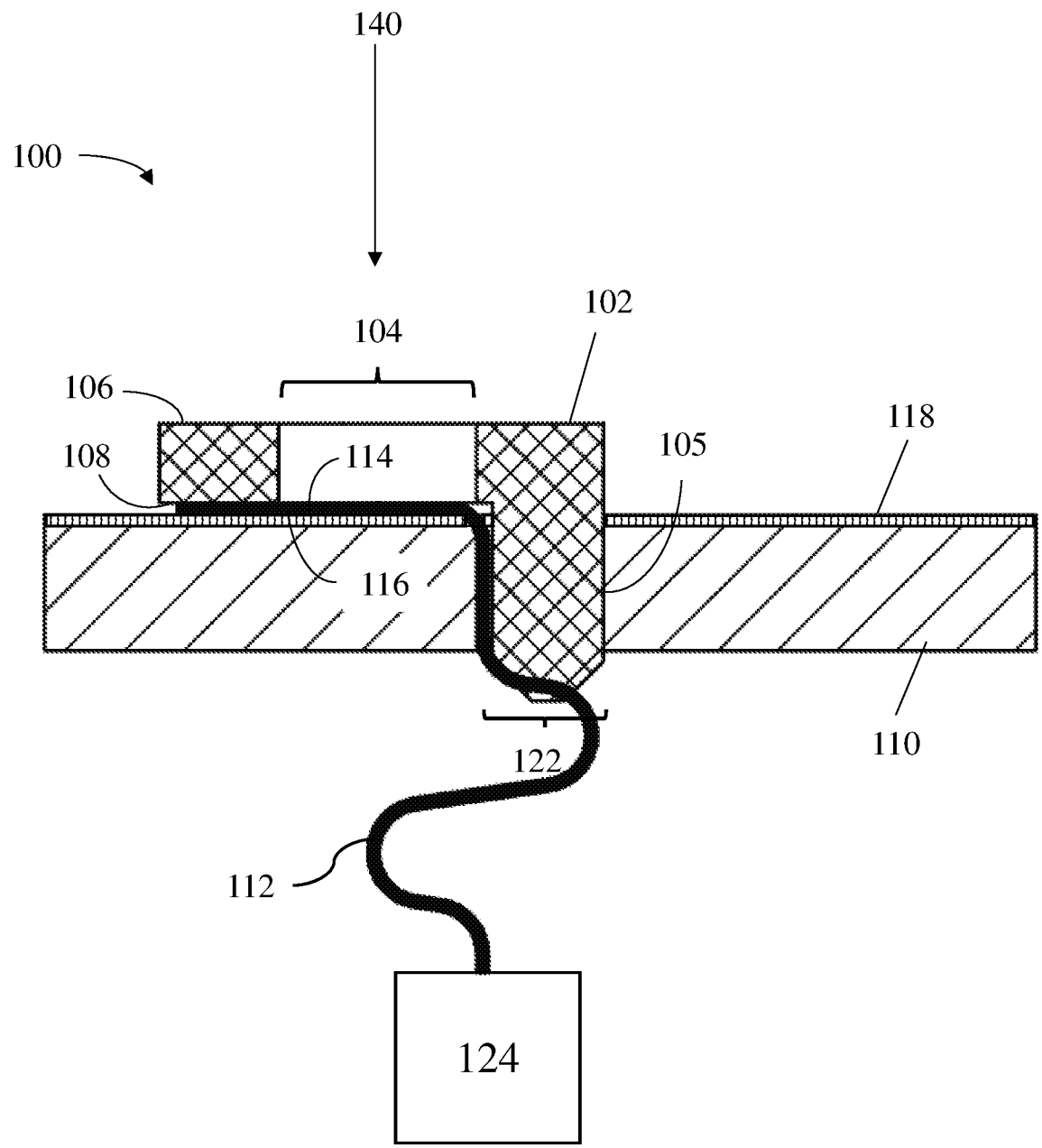
FIG. 1A is, in accordance with some embodiments, a cross-sectional schematic illustration of a joining system.
Figure 1B:
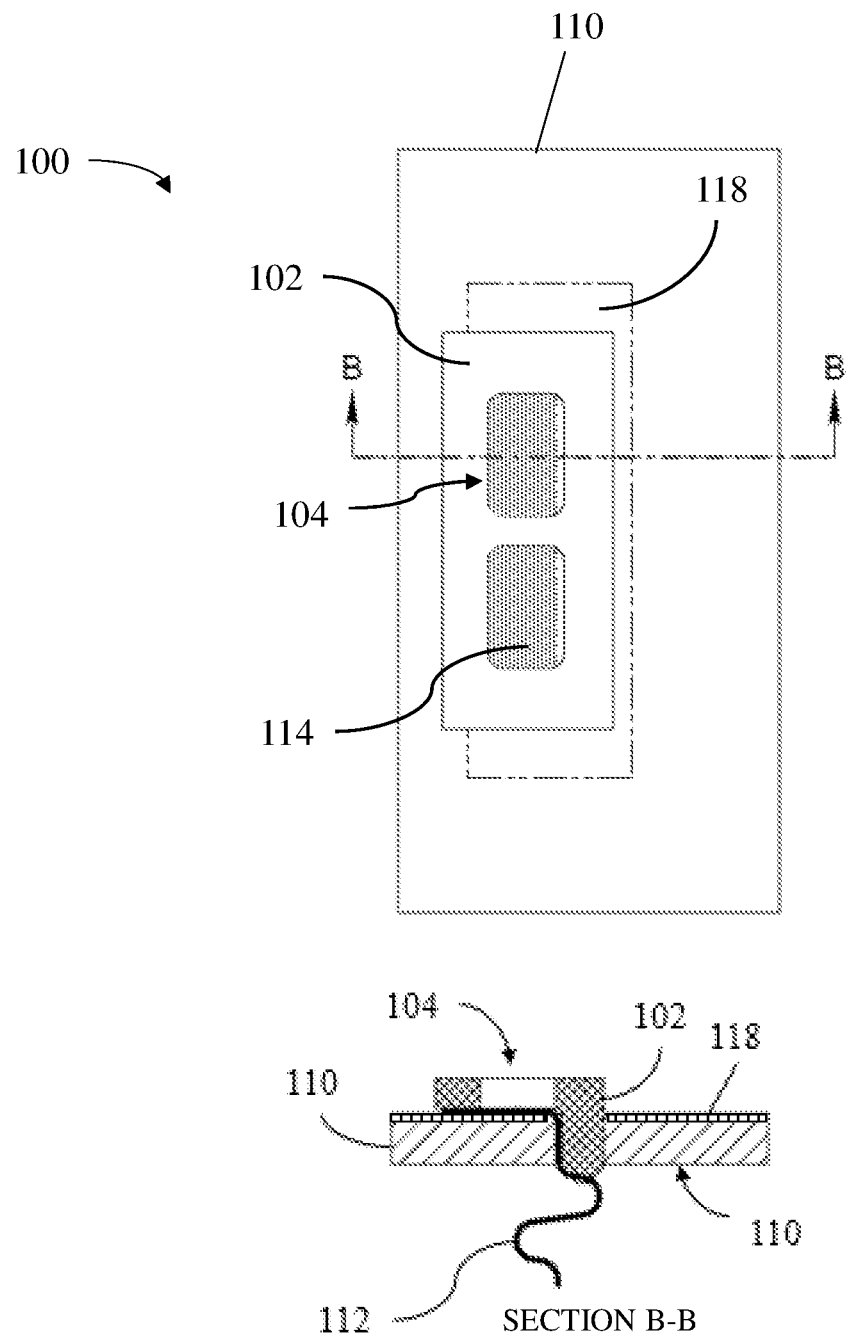
FIG. 1B shows top view and cross-sectional schematic illustrations of the joining system shown in FIG. 1A, in accordance with certain embodiments.
Figure 1C:
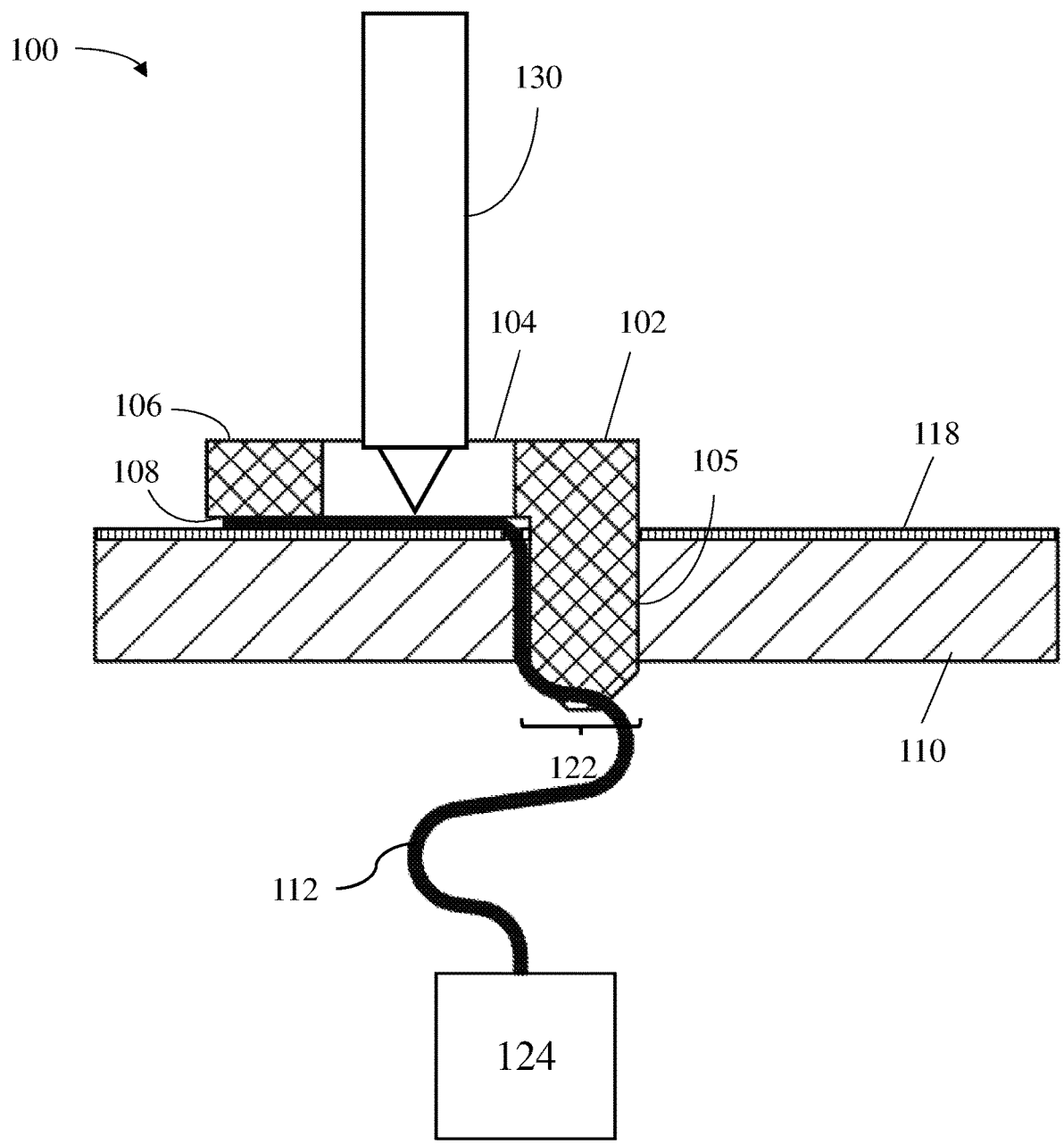
FIG. 1C is a cross-sectional schematic illustration of the joining system shown in FIG. 1A, in accordance with certain embodiments.

Certain aspects are related to joining systems for joining materials (e.g., metal-containing materials, other electronically conductive materials) and methods of joining materials. One non-limiting example of a joining system is illustrated in FIGS. 1A-1C.

In certain embodiments, the joining system comprises a clamping fixture. For example, joining system 100 of FIGS. 1A-1C comprises clamping fixture 102. The clamping fixture may comprise an aperture extending through the clamping fixture. Referring to FIGS. 1A-1C, for example, clamping fixture 102 comprises aperture 104. The aperture extends, in accordance with certain embodiments, completely through the clamping fixture such that an opening is created that bridges one side of the clamping fixture and the other side of the clamping fixture. For example, in FIGS. 1A-1C, aperture 104 extends completely through clamping fixture 102 such that aperture 104 bridges first surface 106 of clamping fixture 102 and second surface 108 of clamping fixture 102. In accordance with certain embodiments, arranging the aperture such that it extends completely through the clamping fixture can allow a source of heat to access underlying materials that are to be thermally joined, as described in more detail below.

The joining system can comprise, according to certain embodiments, a substrate. For example, in FIGS. 1A-1C, joining system 100 comprises substrate 110. In some embodiments, the clamping fixture and substrate include one or more connectors configured to selectively attach the clamping fixture to the substrate such that the clamping fixture may be selectively attached to the substrate in a first connected configuration or removed from the substrate in a second unconnected configuration. Referring to FIGS. 1A-1C, for example, clamping fixture 102 includes a protrusion 105 that is configured to be selectively connected to a corresponding aperture 122 of substrate 110, which can be sized and shaped to selectively retain the protrusion therein. Accordingly, the protrusion 105 of clamping fixture 102 and the aperture 122 of the substrate 110 may form opposing portions of the connector that may be selectively connected to, or separated from, one another. While a particular type of connector is described above relative to the figures, it should be understood that any appropriate type of connector capable of selectively connecting a clamping fixture to a substrate may be used as the disclosure is not so limited. For example, other appropriate types of connectors that are capable of selectively connecting a clamping fixture to a substrate may include, but are not limited to, slot and tab connections, snap fits, interference fits, threaded connections, mechanically interlocking features, detents, latches, clamps, magnets, and/or any other appropriate type of connection capable of selectively attaching a clamping fixture to a substrate. Additionally, while particular portions of a connector are illustrated and described as being located on the substrate or clamping fixture respectively, it should be understood that the current disclosure is not limited to which portion of a connector is located on a particular component.

In certain embodiments, the connection between the clamping fixture and the substrate can be configured to compress two or more materials between the clamping fixture and substrate. For example, in FIGS. 1A-1C, clamping fixture 102 compresses first material 112 (e.g., a metal-containing material) against second material 118 (e.g., a metal-containing material) between clamping fixture 102 and substrate 110. One example of such compression is illustrated in FIGS. 1D-1E. In FIG. 1D, first material 112 has been inserted through aperture 122 of substrate 110, but a gap 145 remains between first material 112 and second material 118, reducing the area of contact between first material 112 and second material 118. In contrast, in FIG. 1E, protrusion 105 of clamping fixture 102 has been inserted into aperture 122 of substrate 110, which applies a compressive force between first material 112 and second material 118, in this case eliminating the gap between them.

In some embodiments, the clamping fixture can include one or more alignment features that aligns the first material (e.g., a metal-containing material), the second material (e.g., a metal-containing material), and the aperture of the clamping fixture. For example, the clamping fixture may include one or more protrusions or indentations that aligns the first material, the second material, and the aperture of the clamping fixture. In some embodiments, configuring the clamping fixture in this way can ensure that, when the clamping fixture is connected to an underlying substrate, the two or more materials are at least partially aligned with the aperture of the clamping fixture (and, optionally, with an aperture of the substrate). One example of such alignment is illustrated in FIGS. 1D-1E. In FIG. 1D, first material 112 has been inserted through aperture 122 of substrate 110. In FIG. 1D, first material 112 is misaligned with second material 118, in this case reducing the area of contact between first material 112 and second material 118. In contrast, in FIG. 1E, protrusion 105 of clamping fixture 102 has been inserted into aperture 122 of substrate 110, increasing the degree to which first material 112 and second material 118 are aligned. In some embodiments, connecting the clamping fixture to the substrate pushes the first material against an edge of the aperture of the substrate. For example, in FIG. 1E, the insertion of protrusion 105 into aperture 122 pushes first material 112 against edge 150 of aperture 122, which can enhance the degree of alignment between first material 112 and second material 118.

The arrangement of materials shown in FIGS. 1A-1C is non-limiting, and other examples in which two or more materials are compressed between a clamping fixture and a substrate are possible, as described in more detail below.

The joining system can be configured to join materials (e.g., metal-containing materials), in some embodiments. Accordingly, the joining system can comprise, in certain embodiments, a first material (e.g., a metal-containing material) and a second material (e.g., a metal-containing material). Referring to FIGS. 1A-1C, for example, joining system 100 further comprises first material 112 and second material 118. The first material and the second material can be made from any of a variety of materials and can assume any of a variety of configurations, specific examples of which are provided in more detail below.

In some embodiments, the aperture of the clamping fixture is disposed against a first surface of the first material (e.g., a metal-containing material). In some embodiments, there is no intermediate material between the aperture of the clamping fixture and the first surface of the first material (in which case, the aperture would be said to be disposed directly against the first surface of the first material). One example of such an arrangement is shown in FIGS. 1A-1C, in which aperture 104 of clamping fixture 102 is disposed directly against first surface 114 of first material 112. In other embodiments, an intermediate material can be present between the aperture of the clamping fixture and the first surface of the first material (in which case, the aperture would be said to be disposed indirectly against the first surface of the first material).

In certain embodiments, the second material (e.g., a metal-containing material) is disposed against a second surface of the first material (e.g., a metal-containing material) opposite the first surface of the first material. In some embodiments, there is no intermediate material between the second material and the first material (in which case, the second material would be said to be disposed directly against the second surface of the first material). One example of such an arrangement is shown in FIGS. 1A-1C, in which second material 118 is disposed directly against second surface 116 of first material 112. In other embodiments, an intermediate material can be present between the second material and the second surface of the first material (in which case, the second material would be said to be disposed indirectly against the second surface of the first material).

In some embodiments, a metallic surface of the second material is in direct contact with a metallic surface of the first material.

In some embodiments, the aperture of the clamping fixture is disposed against a first surface of the first material (e.g., a metal-containing material), and the second material (e.g., a metal-containing material) is disposed against a second surface of the first material opposite the first surface at a location at least partially aligned with the clamping fixture aperture. The second material is considered to be disposed against the second surface of the first material at a location that is at least partially aligned with the clamping fixture aperture when there is overlap between the second material and the second surface of the first material within at least a portion of the aperture area when viewed from the top (e.g., when viewed from the direction of arrow 140 in FIG. 1A). In some embodiments, there is overlap between the second material and the second surface of the first material within over at least 20%, at least 30%, at least 40%, at least 50%, at least 60%, at least 70%, at least 80%, at least 90%, at least 95%, at least 99%, or all of the aperture area when viewed from the top. For example, as shown in FIGS. 1A-1C, aperture 104 of clamping fixture 102 is disposed against first surface 114 of first material 112, and second material 118 is disposed against second surface 116 of first material 112 such that there is overlap (and, in some embodiments, direct contact) between surface 114 and surface 116 over substantially all of the area of aperture 104. In some embodiments, there is overlap between a metallic surface of the second material and a metallic surface of the first material within over at least 20%, at least 30%, at least 40%, at least 50%, at least 60%, at least 70%, at least 80%, at least 90%, at least 95%, at least 99%, or all of the aperture area when viewed from the top.

It should be noted that, in some embodiments, the aperture of the clamping fixture may not be in direct contact with the first surface of the first material (e.g., as shown in FIGS. 1A-1C), and in some embodiments, the aperture may be disposed against a first surface of an intermediate material which has a second surface in direct contact with the first surface of the first material. In some instances, the intermediate material may be a thermally conductive material.

In certain embodiments, the clamping fixture is configured to compress the first material against (e.g., directly against) the second material. Accordingly, certain embodiments comprise arranging the clamping fixture over the first material and the second material such that the clamping fixture compresses the first material against the second material. For example, clamping fixture 102 can be configured to compress first material 112 against second material 118. In FIGS. 1A-1C, for example, clamping fixture 102 may be arranged over first material 112 and second material 118 such that the clamping fixture compresses first material 112 against second material 118.

The joining system can be used, in certain embodiments, to thermally join two materials (e.g., one or both of which may be metal-containing materials). Accordingly, certain embodiments comprise thermally joining the first material and the second material by heating the first material through the aperture of the clamping fixture. For example, in FIG. 1C, heat source 130 can be used to thermally join first material 112 and second material 118 by heating first material 112 through aperture 104 of clamping fixture 102. In some embodiments, a metallic surface of the first material is thermally joined to a metallic surface of the second material.

As described elsewhere herein, in some embodiments, the aperture may be disposed against an intermediate material (e.g., thermal conducting material) that is in direct contact with the first material. In such embodiments, the clamping fixture may be arranged over the intermediate material and the first and second materials such that the clamping fixture compresses the intermediate material against the first material and the second material. In some such embodiments, the first material and second material may be thermally joined by heating the intermediate material through the aperture.

Figure 2A:
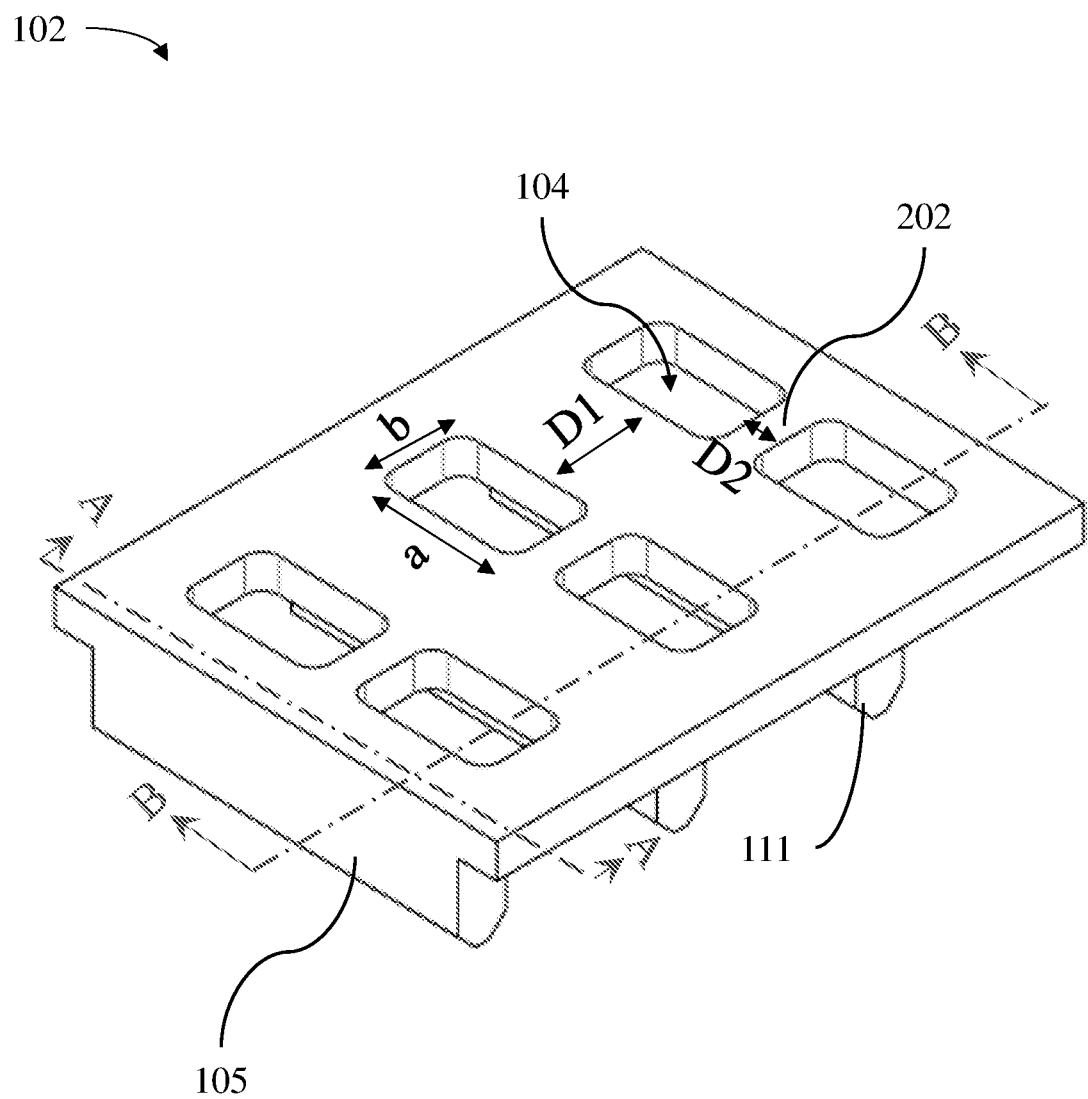
FIG. 2A is a perspective view schematic illustration of a clamping fixture, according to certain embodiments.
Figure 2B:
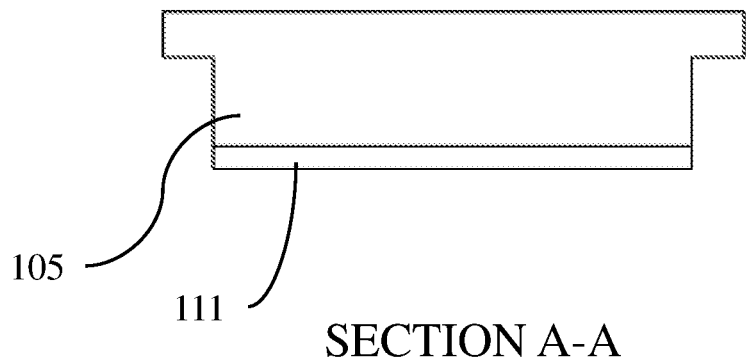
FIG. 2B is a cross-sectional schematic illustration of the clamping fixture shown in FIG. 2A, in accordance with certain embodiments.
Figure 2C:
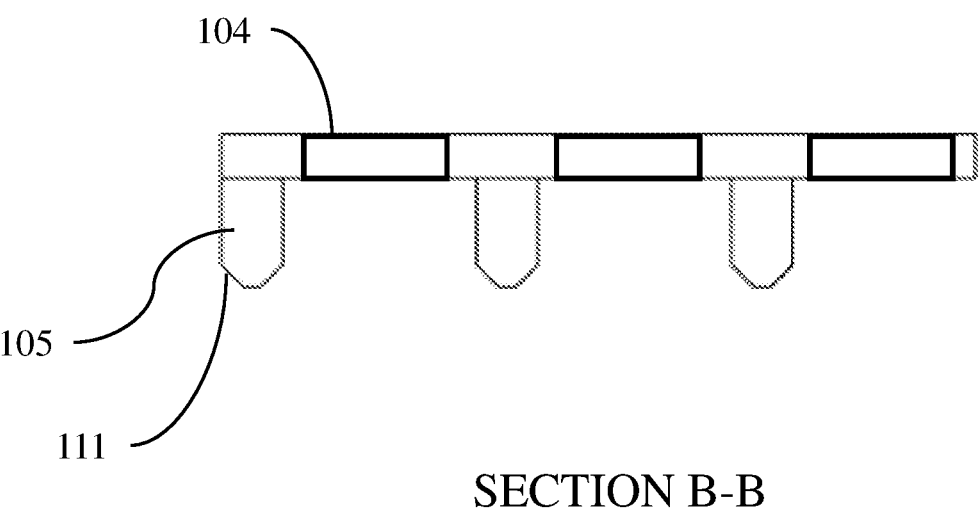
FIG. 2C is a cross-sectional schematic illustration of the clamping fixture shown in FIG. 2A, in accordance with certain embodiments.

In certain embodiments, the clamping fixture comprises a plurality of apertures that extend through the clamping fixture. For example, as shown in FIGS. 2A-2C, clamping fixture 102 comprises multiple (e.g., 6) apertures 104. Specifically, FIGS. 2A-2C show 3 sets of 2 identical apertures with aperture divider 202 between each set of 2 apertures. Each set of apertures may be spaced equidistantly from each other by a distance D1, and the aperture divider between each set of apertures may have a width of D2. According to some embodiments, each of the plurality of apertures may be of any suitable shape and dimensions. For instance, the apertures may be rectangular and have dimensions of a by b (e.g., as shown in FIGS. 2A-2C), but may also have any other appropriate shape (e.g., circular, triangular, square, etc.) and dimensions. The plurality of apertures may be arranged in any pattern (e.g., symmetric, asymmetric, side-by-side, etc.) on the clamping fixture. An appropriate selection of shape, dimension, and arrangement (e.g., spacing, pattern, etc.) of apertures can ensure proper alignment and contact of the clamping fixture and the clamped materials (e.g., the first material), and/or allow for proper thermal joining of the first and second materials via the apertures. For instance, in some embodiments, the apertures are selected to allow for access of a heat source (e.g., laser) to allow thermal joining of the first and second materials (e.g., as shown in FIG. 1C). In some instances, it may be advantageous to select an arrangement of apertures to ensure that proper alignment and/or contact of the clamping fixture with the clamped material is maintained during the thermal joining process. Specifically, in some cases, a side-by-side arrangement of aperture (e.g., two rows of rectangular apertures) with aperture divider (e.g., as shown in FIGS. 2A-2C) may be advantageous in allowing proper contact and alignment of the clamping fixture and the clamped materials (e.g., the first material and the second material). In some embodiments, the use of two or more rows of apertures (each row including at least two apertures) can increase the rigidity of the clamping fixture and/or reduce warping of the clamped materials.

As noted above, in certain embodiments, the clamping fixture may comprise at least one protrusion. In some embodiments, the clamping fixture may comprise at least two protrusions. In FIGS. 1A-1C, for example, clamping fixture 102 comprises one protrusion 105. In FIGS. 2A-2C, clamping fixture 102 comprises multiple (e.g., 3 or more) protrusions 105. The at least one protrusion may be of any suitable shape and dimensions. For instance, as illustrated in FIG. 2C, protrusions 105 may comprise a rectangular shape with end 111 having a trapezoidal shape. In accordance with certain embodiments, the protrusion may comprise any shape as long as it restricts the motion of the clamping fixture after the clamping fixture is disposed against the first material. For instance, the protrusion may form part of a connection between the clamping fixture and the substrate, such that when the clamping fixture is disposed against the first material (e.g., 112 in FIG. 1A), the protrusion can be connected to a receiving connection on the substrate (e.g., a slot) to restrict both the motion of the clamping fixture as well as the first material. In addition, the plurality of protrusions may be arranged in any pattern on the clamping fixture. For instance, the protrusion may be a single piece of rectangular shaped material (e.g., as shown by protrusion 105 in FIG. 2B) spaced equidistantly apart from other protrusions and separated by aperture 104 between protrusions 105 (e.g., as shown in FIG. 2C). It should be noted that any number of protrusions, of any suitable shape or dimension, located in any desired arrangement, may be used as the disclosure is not limited in this respect. In some embodiments, it may be advantageous to use multiple protrusions, as shown in FIGS. 2A-2C to enhance structural stability (e.g., minimize motion) of the clamping fixture after it has been disposed against a first material.

Figure 3:
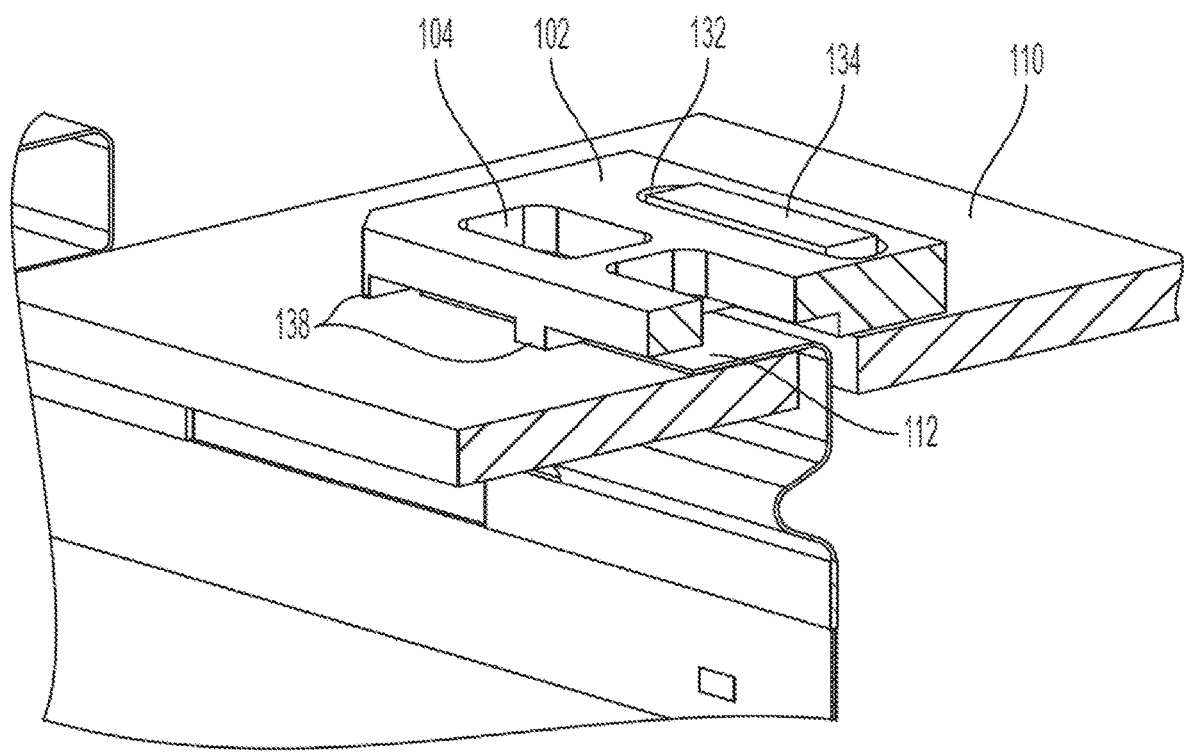
FIG. 3 is a perspective view schematic illustration of a clamping fixture comprising an indentation into which a protrusion of a substrate is inserted, in accordance with certain embodiments.

In certain embodiments, instead of or in addition to one or more protrusions, the clamping fixture may include at least one indentation. For example, in some embodiments, the clamping fixture may comprise at least one protrusion and at least one indentation. The protrusions and/or indentions may assist with fixing the clamping fixture to a substrate when the clamping fixture is disposed against a first material (e.g., as shown in FIGS. 1A-1C). In some embodiments, the indentation in the clamping fixture may be aligned with a protrusion on an underlying substrate, such that the protrusion in the underlying substrate interlocks with the indentation on the clamping fixture. One example of such an embodiment is shown in FIG. 3. In FIG. 3, clamping fixture 102 comprises indentation 132, and substrate 110 comprises protrusion 134. As shown in FIG. 3, protrusion 134 of substrate 110 and indentation 132 of clamping fixture 102 are configured such that the clamping fixture and the substrate are selectively attached to each other (by inserting protrusion 134 into indentation 132). As shown in FIG. 3, indentation 132 extends through the thickness of clamping fixture 102, such that indentation 132 is in the form of an aperture. In other embodiments, indentation 132 may extend only part of the way through the thickness of the clamping fixture.

In some embodiments, the clamping fixture may comprise a plurality of protrusions that contact at least a portion of the underlying substrate and/or the first material. One example of this arrangement is shown in FIG. 3, in which clamping fixture 102 comprises protrusions 138, which contact underlying substrate 110 and first material 112. Such protrusions may, in accordance with certain embodiments, promote structural stability of the clamping fixture and/or enhance the degree to which the first material is compressed against the second material.

In certain embodiments, the clamping fixture may include a first portion of a connector between the clamping fixture and an underlying substrate. The substrate may include a second portion of the connector that mates with the first portion of the connector (which is part of the clamping fixture) such that a connection is established between the clamping fixture and the substrate. In some embodiments, one or more protrusions and/or indentations of the clamping fixture may be used as first portions of a connector. For example, in FIGS. 2A-2C, each of protrusions 105 on clamping fixture 102 may be configured to act as the first portion of a connector. In some such embodiments, a substrate may comprise one or more apertures, which may act as the second portion of the connector. The apertures in the substrate can mate with protrusions 105 and form a connector, such as a press fit connector. While a press fit connector has been described here, any of a variety of other types of connections may be used, including but not limited to snap fits, interference fits, slip fits, clearance fits, threaded connections, mechanically interlocking features, detents, latches, clamps, magnets, and adhesives.

The clamping fixtures described herein may have one or more advantages. For instance, in some embodiments, the clamping fixture can be made via a facile single piece construction and may have low manufacture and/or installation costs. In traditional thermal joining processes, it is often difficult to fix the materials that are to be joined to achieve proper contact and alignment of the materials. Advantageously, the clamping fixture may enable alignment and compression of multiple first and second materials, such that the materials can be properly thermally joined. Additionally, the clamping fixture may allow materials to be thermally joined at multiple locations without having to remove and/or reinstall the clamping fixture.

A variety of materials can be used as the first material. In some embodiments, the first material is a metal-containing material. In certain embodiments, the first material includes at least a portion of a flexible electronically conductive tab. For example, in FIGS. 1A-1C, first material 112 may be or may comprise at least a portion of a flexible electronically conductive tab. Those of ordinary skill in the art are familiar with electrically conductive tabs, which are components capable of transmitting electrical signals and/or power. In certain embodiments, this flexible electronically conductive tab may be in electronic communication with an electrode of an electrochemical cell. For example, as shown in FIG. 1A, first material 112 may be in electronic communication with an electrode of an electrochemical cell 124. As such, the first material (e.g., a flexible electronically conductive tab) may be used to transmit electronic power from the electrochemical cell to the second material.

In some embodiments, the first material can have a relatively small sheet resistance. For example, in some embodiments, the surface of the first material that is to be joined to the second material (e.g., surface 116 in FIGS. 1A-1C) has a sheet resistance of less than less than 1 Ω/sq., less than 100 mΩ/sq., less than 10 mΩ/sq., less than 1 mΩ/sq., less than 0.1 mΩ/sq., or less. In some embodiments, the sheet resistance can be as little as 40 micron/sq., as little as 1 micron/sq., or less. Sheet resistance can be measured using a 4-point probe where a current is applied between 2 of the probes and the voltage is measured between the other 2 probes using a voltmeter.

A variety of materials can be used as the second material. In some embodiments, the second material is a metal-containing material. In certain embodiments, the second material may be an electrically conductive material. The second material may be located, in some embodiments, over a substrate. For instance, as shown in FIGS. 1A-1C, second material 118 may be over substrate 110. In some embodiments, the second material may be a conductive surface of a printed circuit board (PCB). For example, referring to FIGS. 1A-1C, second material 118 may be a conductive surface of a printed circuit board.

In certain embodiments, the second material may comprise two or more components. For example, the second material may be a composite of multiple electrically conductive components (e.g., metals, conductive polymers, etc.). Particular combinations of components may be chosen, in accordance with certain embodiments, to impart one or more desired properties such as, for example, corrosion resistance, electric conductivity, and the like.

In some embodiments, the second material can have a relatively small sheet resistance. For example, in some embodiments, the surface of the second material that is to be joined to the first material (e.g., the top of second material 118 in FIGS. 1A-1C) has a sheet resistance of less than less than 1 Ω/sq., less than 100 mΩ/sq., less than 10 mΩ/sq., less than 1 mΩ/sq., less than 0.1 mΩ/sq., or less. In some embodiments, the sheet resistance can be as little as 40 micron/sq., as little as 1 micron/sq., or less.

As noted above, in certain embodiments, the substrate includes a second portion of the at least one connector (which may be configured to selectively attach the clamping fixture to the substrate). In some embodiments, the second portion of the at least one connector may be an aperture (e.g., a slot). For example, in FIGS. 1A-1C, substrate 110 (as well as second material 118) includes an aperture 122, which can form the second portion of a connector between clamping fixture 102 and substrate 110. Aperture 122 of substrate 110 can mate with a portion of clamping fixture 102 (e.g., protrusion 105) to form the connection. As mentioned above, any of a variety of suitable connectors may be used including, but not limited to, snap fits, press fits, interference fits, slip fits, clearance fits, threaded connections, mechanically interlocking features, detents, latches, clamps, magnets, and adhesives.

Figure 4:
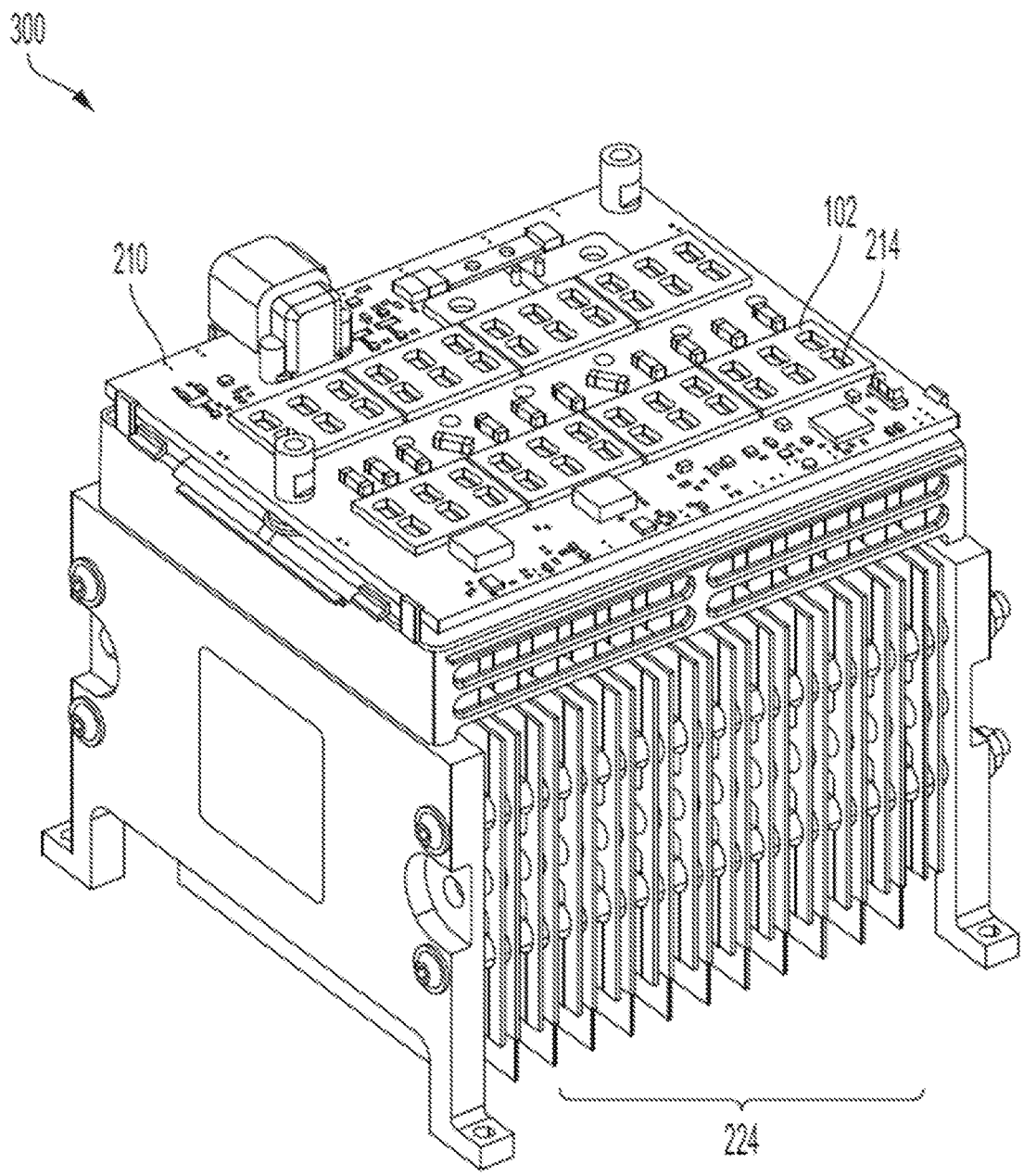
FIG. 4 is a perspective view schematic illustration of a battery pack, according to certain embodiments.

In certain embodiments, the second material may be integrated with the substrate. In certain embodiments, the substrate is a printed circuit board (PCB). In some instances, the second material can form a conductive surface on the PCB. For instance, as shown in FIG. 4, PCB 210 comprises one or more conductive surfaces (e.g., one or more electrically conductive bond pads), and a plurality of clamping fixtures 102 disposed on PCB 210.

In certain embodiments, the substrate is configured such that when the clamping fixture is connected to the substrate, the aperture of the clamping fixture is aligned with a heat source. For instance, the aperture of the clamping fixture can be aligned with a heat source to allow for thermal joining of the two or more materials (e.g., a first material and a second material). As shown in FIG. 1C, for example, heat source 130 may be aligned with aperture 104 of the clamping fixture 102 to allow for thermal joining of first material 112 and second material 118.

Certain embodiments comprise thermally joining two materials that are disposed against a substrate. As shown in FIGS. 1A-1C, a portion of first material 112 and second material 118 are disposed against substrate 110. The first material may be, for example, an electrically conductive tab (e.g., a metal-containing electrically conductive tab) of an electrochemical cell, and the second material may be, for example, a contact pad (e.g., a metal-containing contact pad) of a PCB. In some embodiments, the clamping fixture may be arranged over the first material and the second material such that the clamping fixture compresses the first material against the second material. When in a clamped state, in accordance with certain embodiments, the contact and compression between the first and second materials may lead to an enhanced degree of physical contact between the first and second materials, relative to the degree of physical contact absent the compression but under otherwise identical conditions. In some embodiments, enhancing the degree of physical contact between the first and second materials can improve the degree to which the two materials are joined via the thermal joining process. For example, enhancing the degree of physical contact between the first and second materials can reduce the number and/or volume of voids formed between the first and second materials after the first and second materials have been thermally joined. This can lead to an increase in the efficiency with which electronic power and/or electronic signals may be transmitted between the two materials.

In certain embodiments, as the clamping fixture compresses the first material against the second material, the clamping fixture is attached to a substrate over which the first and second materials are positioned. For example, as shown in FIGS. 1A-1C, the thermal joining process may comprise, in some embodiments, attaching clamping fixture 102 to substrate 110 via a connector. The connector may be any of the connectors disclosed elsewhere herein. Establishing the connection between the clamping fixture and the substrate may provide a compressive force between the first material and the second material, at least partially align the first material with the second material, and immobilize the clamping fixture relative to the substrate, in some embodiments.

In some embodiments, prior to arranging and compressing the first material against the substrate, the first material is routed through an aperture (e.g., a channel, slot, or hole) of the substrate. The aperture through which the first material is routed may be the same aperture that forms part of the connector between the substrate and the clamping fixture. For instance, as shown in FIGS. 1A-1C, first material 112 may be routed through aperture 122 (e.g., a channel, slot, or hole) of substrate 110 before the first material is thermally jointed to second material 118.

In accordance with certain embodiments, the thermal joining comprises heating at least one of the first material and the second material through the aperture. For instance, certain embodiments comprise applying heat to the first material though one or more apertures of the clamping fixture. As shown in FIG. 1C, for example, heat from heat source 130 may be applied to first material 112 though aperture 104.

The first and second materials may be thermally joined using any of a variety of heat sources and methods. For instance, in some embodiments, thermally joining comprises positioning an optical discharge from a laser through the aperture to heat the first material. In some embodiments, heating the first material causes the first material (and, optionally, the second material) to soften (e.g., melt). Upon removal of the heat source, the first material (and, optionally, the second material) may cool and solidify. Melting the first (and second) materials is not required, however. For example, in some embodiments, a third material (e.g., positioned between the first and second materials) may be melted when heat is applied to the first material. It should also be understood that heat sources other than lasers could be used. For example, in some embodiments, a resistive heating element can be used to heat the first metal-containing material. Non-limiting methods of thermally joining the materials include brazing, welding, and soldering.

Certain embodiments comprise removing the clamping fixture from the first and second materials after the first and second materials have been thermally joined. In accordance with some embodiments, the clamping fixture is not permanently bonded (thermally, or otherwise) to either the first or second materials during the thermal joining process, which can allow for the removal and reuse of the clamping fixture. According to certain embodiments, the process of attaching and removing the clamping fixture is reversible the same clamping fixture may be repeatedly used.

Certain aspects are related to joining systems for joining electronic components and methods of joining electronic components. Certain aspects are related to joining flexible electronically conductive tabs to printed circuit boards (PCB) comprising an electronically conductive surface using a clamp fixture configured to compress the flexible electronically conductive tab against the PCB. For example, referring back to FIGS. 1A-1C, in some embodiments, first material 112 can be a flexible electronically conductive tab of an electrochemical cell and substrate 110 can be a printed circuit board (PCB). Second material 118 can be a conductive surface layer of the PCB. As described elsewhere herein, the clamping fixture can comprise an aperture extending through the clamping fixture.

In certain embodiments, the method of thermally joining the flexible electronically conductive tab and the PCB can be similar to the process described above with respect to FIGS. 1A-1C. In certain embodiments, the flexible electronically conductive tab may be threaded through an aperture of the PCB (e.g., aperture 122 in FIGS. 1A-1C). Subsequently, the clamping fixture may be arranged over the flexible electronically conductive tab and an electronically conductive surface of the PCB, such that the clamping fixture compresses the flexible electronically conductive tab against the conductive surface of the PCB. In some embodiments, during compression of the flexible electronically conductive tab against the conductive surface of PCB, the aperture of the clamping fixture may be disposed against a first surface of the flexible electronically conductive tab and the PCB may be disposed against a second surface of the flexible electronically conductive tab opposite the first surface at a location at least partially aligned with the aperture.

According to certain embodiments, during compression of the flexible electronically conductive tab against the conductive surface of PCB, the clamping fixture may be attached to the PCB via a connector. The connector may be any of the connectors described elsewhere herein, such as snap fits, press fits, interference fits, slip fits, clearance fits, threaded connections, mechanically interlocking features, detents, latches, clamps, magnets, and adhesives.

The joining system may be used, in certain embodiments, to thermally join an electronically conductive tab of an electrochemical cell and a PCB. Certain embodiments comprise thermally joining the flexible electronically conductive tab to the conductive surface of the PCB by heating the flexible electronically conductive tab through an aperture (or a plurality of apertures) extending from a first surface of the clamping fixture to a second surface of the clamping fixture opposite the first surface. Any of the methods and/or tools described elsewhere herein may be used to thermally join the flexible electronically conductive tab to the conductive surface of the PCB.

Certain embodiments comprise removing the clamping fixture from the flexible electronically conductive tab and the PCB after the flexible electronically conductive tab and the PCB have been thermally joined.

According to certain embodiments, the use of the clamping fixture can enhance the degree of contact between the flexible electronically conductive tab and the PCB, which, consequently, can enhance the electronic communication between the PCB and a component (e.g., an electrochemical cell) connected to the flexible electronically conductive tab. In some instances, the same process of compression using clamping fixtures and thermal joining may be used to establish electronic communications between a plurality of flexible electronically conductive tabs connected to a battery assembly comprising a plurality of electrochemical cells and the conductive surface of a PCB. For instance, as shown in FIG. 4, system 300 shows a plurality of clamping fixtures 102 disposed on PCB 210 via connections between the clamping fixtures and the PCB. As shown, clamping fixtures 102 may be used to compress a plurality of flexible electronically conductive tabs 214 connected to electrodes of battery assembly 224, and subsequently allow for thermal joining of the electronically conductive tabs to the PCB. The number, size, and arrangement of clamping fixtures may depend on parameters such as the battery capacity, the number of conductive tabs, the size of the PCB, etc., and can be scaled or adjusted according to user needs.

In accordance with certain embodiments, the first material may be an electronically conductive tab such that it allows for transmission of electronic power and/or signal to a device connected to the first material. In some cases, the conductive tabs may be flexible or rigid, and may have a stiffness within any of a variety of ranges, as long as the conductive tabs are capable of being compressed by the clamping fixture to achieve proper alignment and contact with the substrate (e.g., PCB). In some cases, the conductive tab may exhibit a degree of plasticity such that when deformed, the conductive tab retains its new deformed shape once the deforming force has been removed.

The first material (whether in the form of a conductive tab or otherwise) may be made of any of a variety of materials. In some embodiments, the first material is electrically conductive. Examples of materials from which the first material may be formed include, but are not limited to, metals (e.g., copper, gold, silver, aluminum, zinc, etc.), conductive polymers, or combinations thereof. In some embodiments, the first material is a metal-containing material. In some embodiments, a relatively large percentage (e.g., at least 50 wt %, at least 75 wt %, at least 90 wt %, at least 99 wt %, or more) of the first material is made of one or more metals.

In accordance with some embodiments in which the first material forms at least a portion of a conductive tab, the conductive tab may have any of a variety of suitable dimensions, as long as proper compression and thermal joining can be achieved. In some embodiments, the conductive tab may be operatively connected to a power source. The power source may be, for example, a lithium ion battery, or other rechargeable battery.

The second material (whether in the form of a PCB contact or otherwise) may also be made of any of a variety of materials. In some embodiments, the second material is electrically conductive. Examples of materials from which the second material may be formed include, but are not limited to, metals (e.g., copper, gold, silver, aluminum, zinc, etc.), conductive polymers, or combinations thereof. In some embodiments, a relatively large percentage (e.g., at least 50 wt %, at least 75 wt %, at least 90 wt %, at least 99 wt %, or more) of the second material is made of one or more metals.

As noted above, in accordance with certain embodiments, the second material may be a conductive surface on a printed circuit board (PCB). The PCB may be made of any of a variety of suitable materials, such as polymers, ceramics, metals (e.g. copper, gold, silver, aluminum, zinc, etc.), or combination thereof. In some embodiments, the PCB may comprise an electrically insulating material (e.g., polycarbonate resin) over which one or more electrically conductive materials are positioned. The electrically conductive material may comprise, for example, one or more metals (e.g. copper, gold, silver, aluminum, zinc, etc.), conductive polymers, or combination thereof.

In some embodiments, the second material (to which the first material is thermally bonded) is integrated into the PCB. For example, the second material may be or be a part of a bonding pad of a PCB. In certain embodiments, the second material of the PCB may be electronically connected to other portions of the PCB via conductive traces and/or layers. These traces and/or layers may lead to other electronic components that condition or otherwise modify and/or utilize an electric current and/or signal. Additionally, these traces and/or layers may lead to electronic connectors that can distribute the electric power to other electronic assemblies, e.g., other PCBs.

In accordance with certain embodiments, the PCB may have any or a variety of appropriate dimensions. In some embodiments, the PCB has a facial surface area of at least 5 cm$^2$, at least 10 cm$^2$, at least 100 cm$^2$, or more.

In some embodiments, the PCB may include a plurality of apertures through which flexible electronically conductive tabs may be threaded, for example, as described elsewhere herein. In some embodiments, the plurality of apertures may each serve as a second portion of a connector between the PCB and the clamping fixture. In some such embodiments, the apertures within the PCB may be of any appropriate shape and dimension as along as the plurality of a first portion of the at least one connector on the clamping fixture can mate with, e.g., inserted into, the openings.

The clamping fixture may be made of any of a variety of suitable materials. In some embodiments, the clamping fixture is an electrical insulator. In accordance with certain embodiments, the clamping fixture is made of a material that does not bond to the first material or the second material during the thermal joining process. In some embodiments, the clamping fixture is made of a material that can withstand high heat without deformation. Non-limiting examples of materials from which the clamping fixture may be made include polymers (e.g., plastics with a high melting point, such as nylon), glasses, ceramics, and composites of these and other materials.

The clamping fixture may be formed by any of a variety of suitable means including, but not limited to, injection molding, additive manufacturing (e.g., 3D printing), and the like. The clamping fixture could also be formed by assembling a plurality of components via epoxy, adhesives, or ultrasonic welds.

The clamping fixture may have any number of apertures formed within it. In some embodiments, the number of apertures may be dictated by the number of conductive tabs that need to be joined and/or the ease of fabrication. In some embodiments, the clamping fixture has at least 1, at least 2, at least 4, at least 6, at least 8, at least 10, at least 50, or at least 100 apertures. In some instances, the apertures may be arranged in a plurality of side-by-side rows (e.g., in an array, as shown in FIGS. 2A-2C). In one set of embodiments, and as shown in FIGS. 2A-2C, the clamping fixture comprises multiple rows of 2 apertures.

Certain aspects are directed to kits including one or more of the components discussed herein. For example, in some embodiments, the kit comprises a clamping fixture and a substrate. The clamping fixture can be any of the clamping fixtures described herein and may, in some embodiments, comprise an aperture extending through the clamping fixture. In some such embodiments, the clamping fixture and the substrate include one or more connections configured to selectively attach the clamping fixture to the substrate and compress two or more materials between the clamping fixture and substrate such that the two or more materials are at least partially aligned with the aperture. A "kit," as used herein, typically includes a package or an assembly containing one or more of the components of various embodiments described herein, and/or other components associated with various of the embodiments described herein. A kit of the present disclosure may, in some cases, include instructions in any form that are provided in connection with the components of the kit in such a manner that one of ordinary skill in the art would recognize that the instructions are to be associated with the components of the kit. For instance, the instructions may include instructions for the use, modification, assembly, storage, or packaging of the components. In certain embodiments, the instructions include instructions for assembling the clamping fixture and the substrate. In some cases, the instructions may also include instructions for the use of the components, for example, for a particular use, e.g., to thermally join flexible electrical tabs of one or more electrochemical cells to a printed circuit board. The instructions may be provided in any form recognizable by one of ordinary skill in the art as a suitable vehicle for containing such instructions, for example, written or published, verbal, audible (e.g., telephonic), digital, optical, visual (e.g., videotape, DVD, etc.) or electronic communications (including Internet or web-based communications), provided in any manner.

As noted above, in some embodiments, the systems and methods described herein are used to make electrical connections to one or more electrochemical cells. The anodes of the electrochemical cells described herein may comprise a variety of anode active materials. As used herein, the term "anode active material" refers to any electrochemically active species associated with the anode. For example, the anode may comprise a lithium-containing material, wherein lithium is the anode active material. Suitable electroactive materials for use as anode active materials in the anode of the electrochemical cells described herein include, but are not limited to, lithium metal such as lithium foil and lithium deposited onto a conductive substrate, and lithium alloys (e.g., lithium-aluminum alloys and lithium-tin alloys). Methods for depositing a negative electrode material (e.g., an alkali metal anode such as lithium) onto a substrate may include methods such as thermal evaporation, sputtering, jet vapor deposition, and laser ablation. Alternatively, where the anode comprises a lithium foil, or a lithium foil and a substrate, these can be laminated together by a lamination process as known in the art to form an anode. In some embodiments, an electroactive lithium-containing material of an anode active layer comprises greater than 50% (or greater than 75%, greater than 95%, or greater than 99%) by weight of lithium. Additional materials and arrangements suitable for use in the anode are described, for example, in U.S. Patent Publication No. 2010/0035128 to Scordilis-Kelley et al. filed on Aug. 4, 2009, entitled "Application of Force in Electrochemical Cells," which is incorporated herein by reference in its entirety for all purposes.

The cathodes in the electrochemical cells described herein may comprise a variety of cathode active materials. As used herein, the term "cathode active material" refers to any electrochemically active species associated with the cathode. Suitable electroactive materials for use as cathode active materials in the cathode of the electrochemical cells of some embodiments include, but are not limited to, one or more metal oxides, one or more intercalation materials, electroactive transition metal chalcogenides, electroactive conductive polymers, sulfur, carbon and/or combinations thereof.

In some embodiments, the cathode active material comprises one or more metal oxides. In some embodiments, an intercalation cathode (e.g., a lithium-intercalation cathode) may be used. Non-limiting examples of suitable materials that may intercalate ions of an electroactive material (e.g., alkaline metal ions) include metal oxides, titanium sulfide, and iron sulfide. In some embodiments, the cathode is an intercalation cathode comprising a lithium transition metal oxide or a lithium transition metal phosphate. Additional examples include $Li_xCoO_2$ (e.g., $Li_{1.1}CoO_2$), $Li_xNiO_2$, $Li_xMnO_2$, $Li_xMn_2O_4$ (e.g., $Li_{1.05}Mn_2O_4$), $Li_xCoPO_4$, $Li_xMnPO_4$, $LiCo_xNi_{(1-x)}O_2$, and $LiCo_xNi_yMn_{(1-x-y)}O_2$ (e.g., $LiNi_{1/3}Mn_{1/3}CO_{1/3}O_2$, $LiNi_{3/5}Mn_{1/5}Co_{1/5}O_2$, $LiNi_{4/5}Mn_{1/10}Co_{1/10}O_2$, $LiNi_{1/2}Mn_{3/10}Co_{1/5}O_2$). X may be greater than or equal to 0 and less than or equal to 2. X is typically greater than or equal to 1 and less than or equal to 2 when the electrochemical cell is fully discharged, and less than 1 when the electrochemical cell is fully charged. In some embodiments, a fully charged electrochemical cell may have a value of x that is greater than or equal to 1 and less than or equal to 1.05, greater than or equal to 1 and less than or equal to 1.1, or greater than or equal to 1 and less than or equal to 1.2. Further examples include $Li_xNiPO_4$, where ($0<x\le1$), $LiMn_xNi_yO_4$ where ($x+y=2$) (e.g., $LiMn_{1.5}Ni_{0.5}O_4$), $LiNi_xCo_yAl_zO_2$ where ($x+y+z=1$), $LiFePO_4$, and combinations thereof. In some embodiments, the electroactive material within the cathode comprises lithium transition metal phosphates (e.g., $LiFePO_4$), which can, in certain embodiments, be substituted with borates and/or silicates.

As noted above, in some embodiments, the cathode active material comprises one or more chalcogenides. As used herein, the term "chalcogenides" pertains to compounds that contain one or more of the elements of oxygen, sulfur, and selenium. Examples of suitable transition metal chalcogenides include, but are not limited to, the electroactive oxides, sulfides, and selenides of transition metals selected from the group consisting of Mn, V, Cr, Ti, Fe, Co, Ni, Cu, Y, Zr, Nb, Mo, Ru, Rh, Pd, Ag, Hf, Ta, W, Re, Os, and Ir. In one embodiment, the transition metal chalcogenide is selected from the group consisting of the electroactive oxides of nickel, manganese, cobalt, and vanadium, and the electroactive sulfides of iron. In one embodiment, a cathode includes one or more of the following materials: manganese dioxide, iodine, silver chromate, silver oxide and vanadium pentoxide, copper oxide, copper oxyphosphate, lead sulfide, copper sulfide, iron sulfide, lead bismuthate, bismuth trioxide, cobalt dioxide, copper chloride, manganese dioxide, and carbon. In another embodiment, the cathode active layer comprises an electroactive conductive polymer. Examples of suitable electroactive conductive polymers include, but are not limited to, electroactive and electronically conductive polymers selected from the group consisting of polypyrroles, polyanilines, polyphenylenes, polythiophenes, and polyacetylenes. Examples of conductive polymers include polypyrroles, polyanilines, and polyacetylenes.

In some embodiments, electroactive materials for use as cathode active materials in electrochemical cells described herein include electroactive sulfur-containing materials. "Electroactive sulfur-containing materials," as used herein, relates to cathode active materials which comprise the element sulfur in any form, wherein the electrochemical activity involves the oxidation or reduction of sulfur atoms or moieties. The nature of the electroactive sulfur-containing materials useful in the practice of some embodiments may vary widely, as known in the art. For example, in one embodiment, the electroactive sulfur-containing material comprises elemental sulfur. In another embodiment, the electroactive sulfur-containing material comprises a mixture of elemental sulfur and a sulfur-containing polymer. Thus, suitable electroactive sulfur-containing materials may include, but are not limited to, elemental sulfur and organic materials comprising sulfur atoms and carbon atoms, which may or may not be polymeric. Suitable organic materials include those further comprising heteroatoms, conductive polymer segments, composites, and conductive polymers. Additional materials suitable for use in the cathode, and suitable methods for making the cathodes, are described, for example, in U.S. Pat. No. 5,919,587, filed May 21, 1997, entitled "Novel Composite Cathodes, Electrochemical Cells Comprising Novel Composite Cathodes, and Processes for Fabricating Same," and U.S. Patent Publication No. 2010/0035128 to Scordilis-Kelley et al. filed on Aug. 4, 2009, entitled "Application of Force in Electrochemical Cells," each of which is incorporated herein by reference in its entirety for all purposes.

A variety of electrolytes can be used in association with the electrochemical cells described herein. In some embodiments, the electrolyte may comprise a non-solid electrolyte, which may or may not be incorporated with a porous separator. As used herein, the term "non-solid" is used to refer to materials that are unable to withstand a static shear stress, and when a shear stress is applied, the non-solid experiences a continuing and permanent distortion. Examples of non-solids include, for example, liquids, deformable gels, and the like.

The electrolytes used in electrochemical cells described herein can function as a medium for the storage and transport of ions, and in the special case of solid electrolytes and gel electrolytes, these materials may additionally function as a separator between the anode and the cathode. Any liquid, solid, or gel material capable of storing and transporting ions may be used, so long as the material facilitates the transport of ions (e.g., lithium ions) between the anode and the cathode. Exemplary materials suitable for use in the electrolyte are described, for example, in U.S. Patent Publication No. 2010/0035128 to Scordilis-Kelley et al. filed on Aug. 4, 2009, entitled "Application of Force in Electrochemical Cells," which is incorporated herein by reference in its entirety for all purposes.

In some embodiments, the systems, articles, and/or methods described herein can be part of and/or used to make an electrochemical cell (e.g., a rechargeable electrochemical cell). In some embodiments, the systems, articles, and/or methods described herein can be part of and/or used to make an electrochemical cell that is integrated into a battery (e.g., a rechargeable battery).

Figure 5:
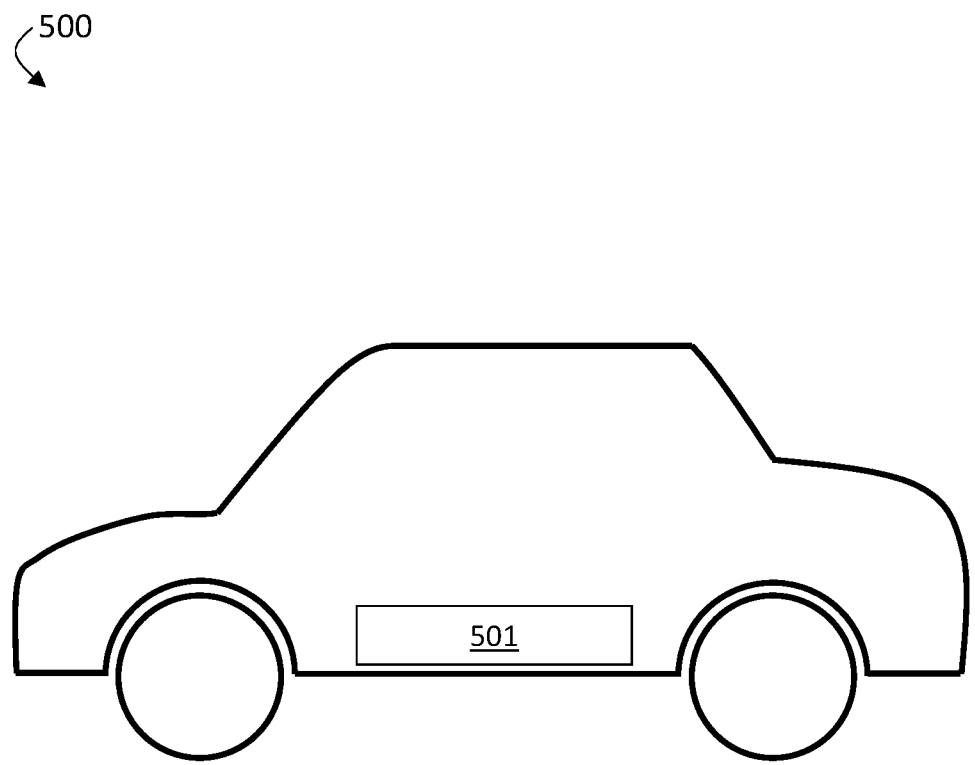
FIG. 5 is a cross-sectional schematic illustration of a vehicle comprising a battery, according to certain embodiments.

In some embodiments, the electrochemical cells and/or batteries (e.g., rechargeable batteries) described in this disclosure can be used to provide power to an electric vehicle or otherwise be incorporated into an electric vehicle. As a non-limiting example, electrochemical cells and/or batteries described in this disclosure (e.g., comprising lithium metal and/or lithium alloy electrochemical cells) can, in certain embodiments, be used to provide power to a drive train of an electric vehicle. The vehicle may be any suitable vehicle, adapted for travel on land, sea, and/or air. For example, the vehicle may be an automobile, truck, motorcycle, boat, helicopter, airplane, and/or any other suitable type of vehicle. FIG. 5 shows a cross-sectional schematic diagram of electric vehicle 500 in the form of an automobile comprising battery 501, in accordance with some embodiments. Battery 501 can, in some instances, provide power to a drive train of electric vehicle 500.

The following documents are incorporated herein by reference in their entireties for all purposes: U.S. Pat. No. 7,247,408, filed May 23, 2001, entitled "Lithium Anodes for Electrochemical Cells"; U.S. Pat. No. 5,648,187, filed Mar. 19, 1996, entitled "Stabilized Anode for Lithium-Polymer Batteries"; U.S. Pat. No. 5,961,672, filed Jul. 7, 1997, entitled "Stabilized Anode for Lithium-Polymer Batteries"; U.S. Pat. No. 5,919,587, filed May 21, 1997, entitled "Novel Composite Cathodes, Electrochemical Cells Comprising Novel Composite Cathodes, and Processes for Fabricating Same"; U.S. patent application Ser. No. 11/400,781, filed Apr. 6, 2006, published as U. S. Pub. No. 2007-0221265, and entitled "Rechargeable Lithium/Water, Lithium/Air Batteries"; International Patent Apl. Serial No.: PCT/US2008/009158, filed Jul. 29, 2008, published as International Pub. No. WO/2009017726, and entitled "Swelling Inhibition in Lithium Batteries"; U.S. patent application Ser. No. 12/312, 764, filed May 26, 2009, published as U.S. Pub. No. 2010-0129699, and entitled "Separation of Electrolytes"; International Patent Apl. Serial No.: PCT/US2008/012042, filed Oct. 23, 2008, published as International Pub. No. WO/2009054987, and entitled "Primer for Battery Electrode"; U.S. patent application Ser. No. 12/069,335, filed Feb. 8, 2008, published as U.S. Pub. No. 2009-0200986, and entitled "Protective Circuit for Energy-Storage Device"; U.S. patent application Ser. No. 11/400,025, filed Apr. 6, 2006, published as U.S. Pub. No. 2007-0224502, and entitled "Electrode Protection in both Aqueous and Non-Aqueous Electrochemical Cells, including Rechargeable Lithium Batteries"; U.S. patent application Ser. No. 11/821, 576, filed Jun. 22, 2007, published as U.S. Pub. No. 2008/0318128, and entitled "Lithium Alloy/Sulfur Batteries"; patent application Ser. No. 11/111,262, filed Apr. 20, 2005, published as U.S. Pub. No. 2006-0238203, and entitled "Lithium Sulfur Rechargeable Battery Fuel Gauge Systems and Methods"; U.S. patent application Ser. No. 11/728,197, filed Mar. 23, 2007, published as U.S. Pub. No. 2008-0187663, and entitled "Co-Flash Evaporation of Polymerizable Monomers and Non-Polymerizable Carrier Solvent/Salt Mixtures/Solutions"; International Patent Apl. Serial No.: PCT/US2008/010894, filed Sep. 19, 2008, published as International Pub. No. WO/2009042071, and entitled "Electrolyte Additives for Lithium Batteries and Related Methods"; International Patent Apl. Serial No.: PCT/US2009/000090, filed Jan. 8, 2009, published as International Pub. No. WO/2009/089018, and entitled "Porous Electrodes and Associated Methods"; U.S. patent application Ser. No. 12/535,328, filed Aug. 4, 2009, published as U.S. Pub. No. 2010/0035128, and entitled "Application of Force In Electrochemical Cells"; U.S. patent application Ser. No. 12/727, 862, filed Mar. 19, 2010, entitled "Cathode for Lithium Battery"; U.S. Patent Apl. Serial No.: 12,471,095, filed May 22, 2009, entitled "Hermetic Sample Holder and Method for Performing Microanalysis Under Controlled Atmosphere Environment"; U.S. patent application Ser. No. 12/862,513, filed on Aug. 24, 2010, entitled "Release System for Electrochemical cells (which claims priority to Provisional Patent Apl. Ser. No. 61/236,322, filed Aug. 24, 2009, entitled "Release System for Electrochemical Cells"); U.S. Provisional Patent Apl. Ser. No. 61/376,554, filed on Aug. 24, 2010, entitled "Electrically Non-Conductive Materials for Electrochemical Cells;" U.S. Provisional patent application Ser. No. 12/862,528, filed on Aug. 24, 2010, entitled "Electrochemical Cell;" U.S. patent application Ser. No. 12/862, 563, filed on Aug. 24, 2010, published as U.S. Pub. No. 2011/0070494, entitled "Electrochemical Cells Comprising Porous Structures Comprising Sulfur"; U.S. patent application Ser. No. 12/862,551, filed on Aug. 24, 2010, published as U.S. Pub. No. 2011/0070491, entitled "Electrochemical Cells Comprising Porous Structures Comprising Sulfur"; U.S. patent application Ser. No. 12/862,576, filed on Aug. 24, 2010, published as U.S. Pub. No. 2011/0059361, entitled "Electrochemical Cells Comprising Porous Structures Comprising Sulfur"; U.S. patent application Ser. No. 12/862,581, filed on Aug. 24, 2010, published as U.S. Pub. No. 2011/0076560, entitled "Electrochemical Cells Comprising Porous Structures Comprising Sulfur"; U.S. Patent Apl. Ser. No. 61/385,343, filed on Sep. 22, 2010, entitled "Low Electrolyte Electrochemical Cells"; and U.S. patent application Ser. No. 13/033,419, filed Feb. 23, 2011, entitled "Porous Structures for Energy Storage Devices". The following applications are also incorporated herein by reference, in their entirety, for all purposes: U.S. Publication No. US-2007-0221265-A1 published on Sep. 27, 2007, filed as U.S. application Ser. No. 11/400,781 on Apr. 6, 2006, and entitled "RECHARGEABLE LITHIUM/WATER, LITHIUM/AIR BATTERIES"; U.S. Publication No. US-2009-0035646-A1, published on Feb. 5, 2009, filed as U.S. application Ser. No. 11/888,339 on Jul. 31, 2007, and entitled "SWELLING INHIBITION IN BATTERIES"; U.S. Publication No. US-2010-0129699-A1 published on May 17, 2010, filed as U.S. application Ser. No. 12/312,764 on Feb. 2, 2010; patented as U.S. Pat. No. 8,617,748 on Dec. 31, 2013, and entitled "SEPARATION OF ELECTROLYTES"; U.S. Publication No. US-2010-0291442-A1 published on Nov. 18, 2010, filed as U.S. application Ser. No. 12/682,011 on Jul. 30, 2010, patented as U.S. Pat. No. 8,871,387 on Oct. 28, 2014, and entitled "PRIMER FOR BATTERY ELECTRODE"; U.S. Publication No. US-2009-

0200986-A1 published on Aug. 13, 2009, filed as U.S. application Ser. No. 12/069,335 on Feb. 8, 2008, patented as U.S. Pat. No. 8,264,205 on Sep. 11, 2012, and entitled "CIRCUIT FOR CHARGE AND/OR DISCHARGE PROTECTION IN AN ENERGY-STORAGE DEVICE"; U.S. Publication No. US-2007-0224502-A1 published on Sep. 27, 2007, filed as U.S. application Ser. No. 11/400,025 on Apr. 6, 2006, patented as U.S. Pat. No. 7,771,870 on Aug. 10, 2010, and entitled "ELECTRODE PROTECTION IN BOTH AQUEOUS AND NON-AQUEOUS ELECTROCHEMICAL CELLS, INCLUDING RECHARGEABLE LITHIUM BATTERIES"; U.S. Publication No. US-2008-0318128-A1 published on Dec. 25, 2008, filed as U.S. application Ser. No. 11/821,576 on Jun. 22, 2007, and entitled "LITHIUM ALLOY/SULFUR BATTERIES"; U.S. Publication No. US-2002-0055040-A1 published on May 9, 2002, filed as U.S. application Ser. No. 09/795,915 on Feb. 27, 2001, patented as U.S. Pat. No. 7,939,198 on May 10, 2011, and entitled "NOVEL COMPOSITE CATHODES, ELECTROCHEMICAL CELLS COMPRISING NOVEL COMPOSITE CATHODES, AND PROCESSES FOR FABRICATING SAME"; U.S. Publication No. US-2006-0238203-A1 published on Oct. 26, 2006, filed as U.S. application Ser. No. 11/111,262 on Apr. 20, 2005, patented as U.S. Pat. No. 7,688,075 on Mar. 30, 2010, and entitled "LITHIUM SULFUR RECHARGEABLE BATTERY FUEL GAUGE SYSTEMS AND METHODS"; U.S. Publication No. US-2008-0187663-A1 published on Aug. 7, 2008, filed as U.S. application Ser. No. 11/728,197 on Mar. 23, 2007, patented as U.S. Pat. No. 8,084,102 on Dec. 27, 2011, and entitled "METHODS FOR CO-FLASH EVAPORATION OF POLYMERIZABLE MONOMERS AND NON-POLYMERIZABLE CARRIER SOLVENT/SALT MIXTURES/SOLUTIONS"; U.S. Publication No. US-2011-0006738-A1 published on Jan. 13, 2011, filed as U.S. application Ser. No. 12/679,371 on Sep. 23, 2010, and entitled "ELECTROLYTE ADDITIVES FOR LITHIUM BATTERIES AND RELATED METHODS"; U.S. Publication No. US-2011-0008531-A1 published on Jan. 13, 2011, filed as U.S. application Ser. No. 12/811,576 on Sep. 23, 2010, patented as U.S. Pat. No. 9,034,421 on May 19, 2015, and entitled "METHODS OF FORMING ELECTRODES COMPRISING SULFUR AND POROUS MATERIAL COMPRISING CARBON"; U.S. Publication No. US-2010-0035128-A1 published on Feb. 11, 2010, filed as U.S. application Ser. No. 12/535,328 on Aug. 4, 2009, patented as U.S. Pat. No. 9,105,938 on Aug. 11, 2015, and entitled "APPLICATION OF FORCE IN ELECTROCHEMICAL CELLS"; U.S. Publication No. US-2011-0165471-A9 published on Jul. 15, 2011, filed as U.S. application Ser. No. 12/180,379 on Jul. 25, 2008, and entitled "PROTECTION OF ANODES FOR ELECTROCHEMICAL CELLS"; U.S. Publication No. US-2006-0222954-A1 published on Oct. 5, 2006, filed as U.S. application Ser. No. 11/452,445 on Jun. 13, 2006, patented as U.S. Pat. No. 8,415,054 on Apr. 9, 2013, and entitled "LITHIUM ANODES FOR ELECTROCHEMICAL CELLS"; U.S. Publication No. US-2010-0239914-A1 published on Sep. 23, 2010, filed as U.S. application Ser. No. 12/727,862 on Mar. 19, 2010, and entitled "CATHODE FOR LITHIUM BATTERY"; U.S. Publication No. US-2010-0294049-A1 published on Nov. 25, 2010, filed as U.S. application Ser. No. 12/471,095 on May 22, 2009, patented as U.S. Pat. No. 8,087,309 on Jan. 3, 2012, and entitled "HERMETIC SAMPLE HOLDER AND METHOD FOR PERFORMING MICROANALYSIS UNDER CONTROLLED ATMOSPHERE ENVIRONMENT"; U.S. Publication No. US-2011-0076560-A1 published on Mar. 31, 2011, filed as U.S. application Ser. No. 12/862,581 on Aug. 24, 2010, and entitled "ELECTROCHEMICAL CELLS COMPRISING POROUS STRUCTURES COMPRISING SULFUR"; U.S. Publication No. US-2011-0068001-A1 published on Mar. 24, 2011, filed as U.S. application Ser. No. 12/862,513 on Aug. 24, 2010, and entitled "RELEASE SYSTEM FOR ELECTROCHEMICAL CELLS"; U.S. Publication No. US-2012-0048729-A1 published on Mar. 1, 2012, filed as U.S. application Ser. No. 13/216,559 on Aug. 24, 2011, and entitled "ELECTRICALLY NON-CONDUCTIVE MATERIALS FOR ELECTROCHEMICAL CELLS"; U.S. Publication No. US-2011-0177398-A1 published on Jul. 21, 2011, filed as U.S. application Ser. No. 12/862,528 on Aug. 24, 2010, patented as U.S. Pat. No. 10,629,947 on Apr. 21, 2020, and entitled "ELECTROCHEMICAL CELL"; U.S. Publication No. US-2011-0070494-A1 published on Mar. 24, 2011, filed as U.S. application Ser. No. 12/862,563 on Aug. 24, 2010, and entitled "ELECTROCHEMICAL CELLS COMPRISING POROUS STRUCTURES COMPRISING SULFUR"; U.S. Publication No. US-2011-0070491-A1 published on Mar. 24, 2011, filed as U.S. application Ser. No. 12/862,551 on Aug. 24, 2010, and entitled "ELECTROCHEMICAL CELLS COMPRISING POROUS STRUCTURES COMPRISING SULFUR"; U.S. Publication No. US-2011-0059361-A1 published on Mar. 10, 2011, filed as U.S. application Ser. No. 12/862,576 on Aug. 24, 2010, patented as U.S. Pat. No. 9,005,809 on Apr. 14, 2015, and entitled "ELECTROCHEMICAL CELLS COMPRISING POROUS STRUCTURES COMPRISING SULFUR"; U.S. Publication No. US-2012-0052339-A1 published on Mar. 1, 2012, filed as U.S. application Ser. No. 13/216,579 on Aug. 24, 2011, and entitled "ELECTROLYTE MATERIALS FOR USE IN ELECTROCHEMICAL CELLS"; U.S. Publication No. US-2012-0070746-A1 published on Mar. 22, 2012, filed as U.S. application Ser. No. 13/240,113 on Sep. 22, 2011, and entitled "LOW ELECTROLYTE ELECTROCHEMICAL CELLS"; U.S. Publication No. US-2011-0206992-A1 published on Aug. 25, 2011, filed as U.S. application Ser. No. 13/033,419 on Feb. 23, 2011, and entitled "POROUS STRUCTURES FOR ENERGY STORAGE DEVICES"; U.S. Publication No. US-2012-0082872-A1 published on Apr. 5, 2012, filed as U.S. application Ser. No. 13/249,605 on Sep. 30, 2011, and entitled "ADDITIVE FOR ELECTROLYTES"; U.S. Publication No. US-2012-0082901-A1 published on Apr. 5, 2012, filed as U.S. application Ser. No. 13/249,632 on Sep. 30, 2011, and entitled "LITHIUM-BASED ANODE WITH IONIC LIQUID POLYMER GEL"; U.S. Publication No. US-2013-0164635-A1 published on Jun. 27, 2013, filed as U.S. application Ser. No. 13/700,696 on Mar. 6, 2013, patented as U.S. Pat. No. 9,577,243 on Feb. 21, 2017, and entitled "USE OF EXPANDED GRAPHITE IN LITHIUM/SULPHUR BATTERIES"; U.S. Publication No. US-2013-0017441-A1 published on Jan. 17, 2013, filed as U.S. application Ser. No. 13/524,662 on Jun. 15, 2012, patented as U.S. Pat. No. 9,548,492 on Jan. 17, 2017, and entitled "PLATING TECHNIQUE FOR ELECTRODE"; U.S. Publication No. US-2013-0224601-A1 published on Aug. 29, 2013, filed as U.S. application Ser. No. 13/766,862 on Feb. 14, 2013, patented as U.S. Pat. No. 9,077,041 on Jul. 7, 2015, and entitled "ELECTRODE STRUCTURE FOR ELECTROCHEMICAL CELL"; U.S. Publication No. US-2013-0252103-A1 published on Sep. 26, 2013, filed as U.S. application Ser. No. 13/789,783 on Mar. 8, 2013, patented as U.S. Pat. No. 9,214,678 on Dec. 15, 2015, and entitled "POROUS SUPPORT STRUCTURES, ELECTRODES CONTAINING SAME, AND ASSOCIATED METHODS"; U.S. Publication No. US-2015-0287998-A1 published on Oct. 8, 2015, filed as U.S. application Ser. No. 14/743,304 on Jun. 18, 2015, patented as U.S. Pat. No. 9,577,267 on Feb. 21, 2017, and entitled "ELECTRODE STRUCTURE AND METHOD FOR MAKING SAME"; U.S. Publication No. US-2013-0095380-A1 published on Apr. 18, 2013, filed as U.S. application Ser. No. 13/644,933 on Oct. 4, 2012, patented as U.S. Pat. No. 8,936,870 on Jan. 20, 2015, and entitled "ELECTRODE STRUCTURE AND METHOD FOR MAKING THE SAME"; U.S. Publication No. US-2012-0052397-A1 published on Mar. 1, 2012, filed as U.S. application Ser. No. 13/216,538 on Aug. 24, 2011, patented as U.S. Pat. No. 9,853,287 on Dec. 26, 2017, and entitled "ELECTROLYTE MATERIALS FOR USE IN ELECTROCHEMICAL CELLS"; U.S. Publication No. US-2014-0123477-A1 published on May 8, 2014, filed as U.S. application Ser. No. 14/069,698 on Nov. 1, 2013, patented as U.S. Pat. No. 9,005,311 on Apr. 14, 2015, and entitled "ELECTRODE ACTIVE SURFACE PRETREATMENT"; U.S. Publication No. US-2014-0193723-A1 published on Jul. 10, 2014, filed as U.S. application Ser. No. 14/150,156 on Jan. 8, 2014, patented as U.S. Pat. No. 9,559,348 on Jan. 31, 2017, and entitled "CONDUCTIVITY CONTROL IN ELECTROCHEMICAL CELLS"; U.S. Publication No. US-2014-0255780-A1 published on Sep. 11, 2014, filed as U.S. application Ser. No. 14/197,782 on Mar. 5, 2014, patented as U.S. Pat. No. 9,490,478 on Nov. 8, 2016, and entitled "ELECTROCHEMICAL CELLS COMPRISING FIBRIL MATERIALS"; U.S. Publication No. US-2014-0272594-A1 published on Sep. 18, 2014, filed as U.S. application Ser. No. 13/833,377 on Mar. 15, 2013, and entitled "PROTECTIVE STRUCTURES FOR ELECTRODES"; U.S. Publication No. US-2014-0272597-A1 published on Sep. 18, 2014, filed as U.S. application Ser. No. 14/209,274 on Mar. 13, 2014, patented as U.S. Pat. No. 9,728,768 on Aug. 8, 2017, and entitled "PROTECTED ELECTRODE STRUCTURES AND METHODS"; U.S. Publication No. US-2015-0280277-A1 published on Oct. 1, 2015, filed as U.S. application Ser. No. 14/668,102 on Mar. 25, 2015, patented as U.S. Pat. No. 9,755,268 on Sep. 5, 2017, and entitled "GEL ELECTROLYTES AND ELECTRODES"; U.S. Publication No. US-2015-0180037-A1 published on Jun. 25, 2015, filed as U.S. application Ser. No. 14/576,570 on Dec. 19, 2014, patented as U.S. Pat. No. 10,020,512 on Jul. 10, 2018, and entitled "POLYMER FOR USE AS PROTECTIVE LAYERS AND OTHER COMPONENTS IN ELECTROCHEMICAL CELLS"; U.S. Publication No. US-2015-0349310-A1 published on Dec. 3, 2015, filed as U.S. application Ser. No. 14/723,132 on May 27, 2015, patented as U.S. Pat. No. 9,735,411 on Aug. 15, 2017, and entitled "POLYMER FOR USE AS PROTECTIVE LAYERS AND OTHER COMPONENTS IN ELECTROCHEMICAL CELLS"; U.S. Publication No. US-2014-0272595-A1 published on Sep. 18, 2014, filed as U.S. application Ser. No. 14/203,802 on Mar. 11, 2014, and entitled "COMPOSITIONS FOR USE AS PROTECTIVE LAYERS AND OTHER COMPONENTS IN ELECTROCHEMICAL CELLS"; U.S. Publication No. US-2019-0006699-A1 published on Jan. 3, 2019, filed as U.S. application Ser. No. 15/727,438 on Oct. 6, 2017, and entitled "PRESSURE AND/OR TEMPERATURE MANAGEMENT IN ELECTROCHEMICAL SYSTEMS"; U.S. Publication No. US-2014-0193713-A1 published on Jul. 10, 2014, filed as U.S. application Ser. No. 14/150,196 on Jan. 8, 2014, patented as U.S. Pat. No. 9,531,009 on Dec. 27, 2016, and entitled "PASSIVATION OF ELECTRODES IN ELECTROCHEMICAL CELLS"; U.S. Publication No. US-2014-0127577-A1 published on May 8, 2014, filed as U.S. application Ser. No. 14/068,333 on Oct. 31, 2013, patented as U.S. Pat. No. 10,243,202 on Mar. 26, 2019, and entitled "POLYMERS FOR USE AS PROTECTIVE LAYERS AND OTHER COMPONENTS IN ELECTROCHEMICAL CELLS"; U.S. Publication No. US-2015-0318539-A1 published on Nov. 5, 2015, filed as U.S. application Ser. No. 14/700,258 on Apr. 30, 2015, patented as U.S. Pat. No. 9,711,784 on Jul. 18, 2017, and entitled "ELECTRODE FABRICATION METHODS AND ASSOCIATED SYSTEMS AND ARTICLES"; U.S. Publication No. US-2014-0272565-A1 published on Sep. 18, 2014, filed as U.S. application Ser. No. 14/209,396 on Mar. 13, 2014, patented as U.S. Pat. No. 10,862,105 on Dec. 8, 2020 and entitled "PROTECTED ELECTRODE STRUCTURES"; U.S. Publication No. US-2015-0010804-A1 published on Jan. 8, 2015, filed as U.S. application Ser. No. 14/323,269 on Jul. 3, 2014, patented as U.S. Pat. No. 9,994,959 on Jun. 12, 2018, and entitled "CERAMIC/POLYMER MATRIX FOR ELECTRODE PROTECTION IN ELECTROCHEMICAL CELLS, INCLUDING RECHARGEABLE LITHIUM BATTERIES"; U.S. Publication No. US-2015-0162586-A1 published on Jun. 11, 2015, filed as U.S. application Ser. No. 14/561,305 on Dec. 5, 2014, and entitled "NEW SEPARATOR"; U.S. Publication No. US-2015-0044517-A1 published on Feb. 12, 2015, filed as U.S. application Ser. No. 14/455,230 on Aug. 8, 2014, patented as U.S. Pat. No. 10,020,479 on Jul. 10, 2018, and entitled "SELF-HEALING ELECTRODE PROTECTION IN ELECTROCHEMICAL CELLS"; U.S. Publication No. US-2015-0236322-A1 published on Aug. 20, 2015, filed as U.S. application Ser. No. 14/184,037 on Feb. 19, 2014, patented as U.S. Pat. No. 10,490,796 on Nov. 26, 2019, and entitled "ELECTRODE PROTECTION USING ELECTROLYTE-INHIBITING ION CONDUCTOR"; U.S. Publication No. US-2015-0236320-A1 published on Aug. 20, 2015, filed as U.S. application Ser. No. 14/624,641 on Feb. 18, 2015, patented as U.S. Pat. No. 9,653,750 on May 16, 2017, and entitled "ELECTRODE PROTECTION USING A COMPOSITE COMPRISING AN ELECTROLYTE-INHIBITING ION CONDUCTOR"; U.S. Publication No. US-2016-0118638-A1 published on Apr. 28, 2016, filed as U.S. application Ser. No. 14/921,381 on Oct. 23, 2015, and entitled "COMPOSITIONS FOR USE AS PROTECTIVE LAYERS AND OTHER COMPONENTS IN ELECTROCHEMICAL CELLS"; U.S. Publication No. US-2016-0118651-A1 published on Apr. 28, 2016, filed as U.S. application Ser. No. 14/918,672 on Oct. 21, 2015, and entitled "ION-CONDUCTIVE COMPOSITE FOR ELECTROCHEMICAL CELLS"; U.S. Publication No. US-2016-0072132-A1 published on Mar. 10, 2016, filed as U.S. application Ser. No. 14/848,659 on Sep. 9, 2015, and entitled "PROTECTIVE LAYERS IN LITHIUM-ION ELECTROCHEMICAL CELLS AND ASSOCIATED ELECTRODES AND METHODS"; U.S. Publication No. US-2018-0138542-A1 published on May 17, 2018, filed as U.S. application Ser. No. 15/567,534 on Oct. 18, 2017, patented as U.S. Pat. No. 10,847,833 on Nov. 24, 2020 and entitled "GLASS-CERAMIC ELECTROLYTES FOR LITHIUM-SULFUR BATTERIES"; U.S. Publication No. US-2016-0344067-A1 published on Nov. 24, 2016, filed as U.S. application Ser. No. 15/160,191 on May 20, 2016, patented as U.S. Pat. No. 10,461,372 on Oct. 29, 2019, and entitled "PROTECTIVE LAYERS FOR ELECTROCHEMICAL CELLS"; U.S. Publication No. US-2020-0099108-A1 published on Mar. 26, 2020, filed as U.S. application Ser. No. 16/587,939 on Sep.

30, 2019, and entitled "PROTECTIVE LAYERS FOR ELECTROCHEMICAL CELLS"; U.S. Publication No. US-2017-0141385-A1 published on May 18, 2017, filed as U.S. application Ser. No. 15/343,890 on Nov. 4, 2016, and entitled "LAYER COMPOSITE AND ELECTRODE HAVING A SMOOTH SURFACE, AND ASSOCIATED METHODS"; U.S. Publication No. US-2017-0141442-A1 published on May 18, 2017, filed as U.S. application Ser. No. 15/349,140 on Nov. 11, 2016, and entitled "ADDITIVES FOR ELECTROCHEMICAL CELLS"; patented as U.S. patent Ser. No. 10/320,031 on Jun. 11, 2019, and entitled "ADDITIVES FOR ELECTROCHEMICAL CELLS"; U.S. Publication No. US-2017-0149086-A1 published on May 25, 2017, filed as U.S. application Ser. No. 15/343,635 on Nov. 4, 2016, patented as U.S. Pat. No. 9,825,328 on Nov. 21, 2017, and entitled "IONICALLY CONDUCTIVE COMPOUNDS AND RELATED USES"; U.S. Publication No. US-2018-0337406-A1 published on Nov. 22, 2018, filed as U.S. application Ser. No. 15/983,352 on May 18, 2018, patented as U.S. Pat. No. 10,868,306 on Dec. 15, 2020 and entitled "PASSIVATING AGENTS FOR ELECTROCHEMICAL CELLS"; U.S. Publication No. US-2018-0261820-A1 published on Sep. 13, 2018, filed as U.S. application Ser. No. 15/916,588 on Mar. 9, 2018, and entitled "ELECTROCHEMICAL CELLS COMPRISING SHORT-CIRCUIT RESISTANT ELECTRONICALLY INSULATING REGIONS"; U.S. Publication No. US-2020-0243824-A1 published on Jul. 30, 2020, filed as U.S. application Ser. No. 16/098,654 on Nov. 2, 2018, patented as U.S. Pat. No. 10,991,925 on Apr. 27, 2021 and entitled "COATINGS FOR COMPONENTS OF ELECTROCHEMICAL CELLS"; U.S. Publication No. US-2018-0351158-A1 published on Dec. 6, 2018, filed as U.S. application Ser. No. 15/983,363 on May 18, 2018, patented as U.S. Pat. No. 10,944,094 on Mar. 9, 2021 and entitled "PASSIVATING AGENTS FOR ELECTROCHEMICAL CELLS"; U.S. Publication No. US-2018-0277850-A1, published on Sep. 27, 2018, filed as U.S. application Ser. No. 15/923,342 on Mar. 16, 2018, and patented as U.S. Pat. No. 10,720,648 on Jul. 21, 2020, and entitled "ELECTRODE EDGE PROTECTION IN ELECTROCHEMICAL CELLS"; U.S. Publication No. US-2018-0358651-A1, published on Dec. 13, 2018, filed as U.S. application Ser. No. 16/002,097 on Jun. 7, 2018, and patented as U.S. Pat. No. 10,608,278 on Mar. 31, 2020, and entitled "IN SITU CURRENT COLLECTOR"; U.S. Publication No. US-2017-0338475-A1, published on Nov. 23, 2017, filed as U.S. application Ser. No. 15/599,595 on May 19, 2017, patented as U.S. Pat. No. 10,879,527 on Dec. 29, 2020 and entitled "PROTECTIVE LAYERS FOR ELECTRODES AND ELECTROCHEMICAL CELLS"; U.S. Publication No. US-2019-0088958-A1, published on Mar. 21, 2019, filed as U.S. application Ser. No. 16/124,384 on Sep. 7, 2018, and entitled "PROTECTIVE MEMBRANE FOR ELECTROCHEMICAL CELLS"; U.S. Publication No. US-2019-0348672-A1, published on Nov. 14, 2019, filed as U.S. application Ser. No. 16/470,708 on Jun. 18, 2019, and entitled "PROTECTIVE LAYERS COMPRISING METALS FOR ELECTROCHEMICAL CELLS"; U.S. Publication No. US-2017-0200975-A1, published Jul. 13, 2017, filed as U.S. application Ser. No. 15/429,439 on Feb. 10, 2017, and patented as U.S. Pat. No. 10,050,308 on Aug. 14, 2018, and entitled "LITHIUM-ION ELECTROCHEMICAL CELL, COMPONENTS THEREOF, AND METHODS OF MAKING AND USING SAME"; U.S. Publication No. US-2018-0351148-A1, published Dec. 6, 2018, filed as U.S. application Ser. No. 15/988,182 on May 24, 2018, and entitled "IONICALLY CONDUCTIVE COMPOUNDS AND RELATED USES"; U.S. Publication No. US-2018-0254516-A1, published Sep. 6, 2018, filed as U.S. application Ser. No. 15/765,362 on Apr. 2, 2018, and entitled "NON-AQUEOUS ELECTROLYTES FOR HIGH ENERGY LITHIUM-ION BATTERIES"; U.S. Publication No. US-2020-0044460-A1, published Feb. 6, 2020, filed as U.S. Application No. 16,527,903 on Jul. 31, 2019, and entitled "MULTIPLEXED CHARGE DISCHARGE BATTERY MANAGEMENT SYSTEM"; U.S. Publication No. US-2020-0220146-A1, published Jul. 9, 2020, filed as U.S. application Ser. No. 16/724,586 on Dec. 23, 2019, and entitled "ISOLATABLE ELECTRODES AND ASSOCIATED ARTICLES AND METHODS"; U.S. Publication No. US-2020-0220149-A1, published Jul. 9, 2020, filed as U.S. application Ser. No. 16/724,596 on Dec. 23, 2019, and entitled "ELECTRODES, HEATERS, SENSORS, AND ASSOCIATED ARTICLES AND METHODS"; U.S. Publication No. US-2020-0220197-A1, published Jul. 9, 2020, filed as U.S. application Ser. No. 16/724,612 on Dec. 23, 2019, and entitled "FOLDED ELECTROCHEMICAL DEVICES AND ASSOCIATED METHODS AND SYSTEMS"; U.S. Publication No. US-2020-0373578-A1 published Nov. 26, 2020, filed as U.S. application Ser. No. 16/879,861 on May 21, 2020, and entitled "ELECTROCHEMICAL DEVICES INCLUDING POROUS LAYERS", International Patent Application Publication No. WO2020/237014, filed as International Application No. PCT/US2020/033938 on May 21, 2020, and entitled "ELECTRICALLY COUPLED ELECTRODES, AND ASSOCIATED ARTICLES AND METHODS"; U.S. Publication No. US-2020-0373551-A1 published Nov. 26, 2020, filed as U.S. application Ser. No. 16/879,839 on May 21, 2020, and entitled "ELECTRICALLY COUPLED ELECTRODES, AND ASSOCIATED ARTICLES AND METHODS", International Patent Application Publication No. WO2020/257414, filed as International Patent Application No. PCT/US2020/038375 on Jun. 18, 2020, and entitled "METHODS, SYSTEMS, AND DEVICES FOR APPLYING FORCES TO ELECTROCHEMICAL DEVICES," U.S. Publication No. US-2020-0395585-A1 published Dec. 17, 2020, filed as U.S. application Ser. No. 16/057,050 on Aug. 7, 2018, and entitled "LITHIUM-COATED SEPARATORS AND ELECTROCHEMICAL CELLS COMPRISING THE SAME", U.S. Publication No. US-2021-0057753-A1 published Feb. 25, 2021, filed as U.S. application Ser. No. 16/994,006 on Aug. 14, 2020, and entitled "ELECTROCHEMICAL CELLS AND COMPONENTS COMPRISING THIOL GROUP-CONTAINING SPECIES", U.S. Publication No. US-2021-0135297-A1 published on May 6, 2021, filed as U.S. application Ser. No. 16/670,905 on Oct. 31, 2019, and entitled SYSTEM AND METHOD FOR OPERATING A RECHARGEABLE ELECTROCHEMICAL CELL OR BATTERY", U.S. Publication No. US-2021-0138673-A1 published on May 13, 2021, filed as U.S. application Ser. No. 17/089,092 on Nov. 4, 2020, and entitled "ELECTRODE CUTTING INSTRUMENT", U.S. Publication No. US-2021-0135294-A1 published on May 6, 2021, filed as U.S. application Ser. No. 16/670,933 on Oct. 31, 2019, and entitled "SYSTEM AND METHOD FOR OPERATING A RECHARGEABLE ELECTROCHEMICAL CELL OR BATTERY"; U.S. Publication No. US-2021-0151839-A1 published on May 20, 2021, filed as U.S. application Ser. No. 16/952,177 on Nov. 19, 2020, and entitled "BATTERIES, AND ASSOCIATED SYSTEMS AND METHODS"; U.S. Publication No. US-2021-0151830-A1 published on May 20, 2021, filed as U.S.

application Ser. No. 16/952,235 on Nov. 19, 2020, and entitled "BATTERIES WITH COMPONENTS INCLUDING CARBON FIBER, AND ASSOCIATED SYSTEMS AND METHODS"; U.S. Publication No. US-2021-0151817-A1 published on May 20, 2021, filed as U.S. application Ser. No. 16/952,228 on Nov. 19, 2020, and entitled "BATTERY ALIGNMENT, AND ASSOCIATED SYSTEMS AND METHODS". All other patents and patent applications disclosed herein are also incorporated by reference in their entirety for all purposes.

U.S. Provisional Patent Application No. 63/064,544, filed Aug. 12, 2020, and entitled "Joining Systems, Clamping Fixtures, and Related Systems and Methods" is incorporated herein by reference in its entirety for all purposes.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A battery pack, comprising:
an electrochemical cell comprising an electrode;
a flexible electronically conductive tab in electronic communication with the electrode;
a printed circuit board (PCB) comprising an electronically conductive surface; and
a clamping fixture comprising an aperture extending from a first surface of the clamping fixture, through the clamping fixture, and to a second surface of the clamping fixture,
wherein:
the second surface of the clamping fixture is disposed against a first surface of the flexible electronically conductive tab,
the electronically conductive surface of the PCB is disposed against a second surface of the flexible electronically conductive tab opposite the first surface of the flexible electronically conductive tab at a location at least partially aligned with the aperture, and
the clamping fixture is configured to compress the flexible electronically conductive tab against the electronically conductive surface of the PCB.

2. The battery pack of claim 1, wherein the clamping fixture includes a first portion of at least one connector and the PCB includes a second portion of the at least one connector that mates with the first portion of the at least one connector.

3. The battery pack of claim 2, wherein the at least one connector includes at least one selected from the group of snap fits, press fits, interference fits, slip fits, clearance fits, threaded connections, mechanically interlocking features, detents, latches, clamps, magnets, and adhesives.

4. The battery pack of claim 1, wherein the clamping fixture comprises a plurality of apertures that extend through the clamping fixture.

5. A method of thermally joining a flexible electronically conductive tab and a PCB, the method comprising:
   compressing the flexible electronically conductive tab of the battery pack of claim 1 against the conductive surface of the PCB; and
   thermally joining the flexible electronically conductive tab to the conductive surface of the PCB by heating the flexible electronically conductive tab through the aperture.

6. The battery pack of claim 1, wherein the flexible electronically conductive tab comprises a metal-containing material.

7. The battery pack of claim 1, wherein the electronically conductive surface of the PCB comprises a metal-containing material.

8. The battery pack of claim 1, wherein the clamping fixture comprises at least one protrusion.

9. The battery pack of claim 1, wherein the clamping fixture comprise at least one indentation.

10. The battery pack of claim 1, wherein the clamping fixture comprises at least two protrusions.

11. The battery pack of claim 1, wherein the flexible electronically conductive tab is joined to the electronically conductive surface of the PCB.

12. The battery pack of claim 11, wherein the flexible electronically conductive tab is joined to the electronically conductive surface of the PCB via a weld.

13. The battery pack of claim 1, wherein the electrode is an anode comprising lithium as an anode active material.

14. The battery pack of claim 1, wherein:
   the clamping fixture includes a first portion of at least one connector and the PCB includes a second portion of the at least one connector that mates with the first portion of the at least one connector, the at least one connector including at least one selected from the group of snap fits, press fits, interference fits, slip fits, clearance fits, threaded connections, mechanically interlocking features, detents, latches, clamps, magnets, and adhesives;
   the clamping fixture comprises a plurality of apertures that extend through the clamping fixture;
   the flexible electronically conductive tab comprises a metal-containing material;
   the electronically conductive surface of the PCB comprises a metal-containing material;
   the flexible electronically conductive tab is joined to the electronically conductive surface of the PCB via a weld; and
   the electrode is an anode comprising lithium as an anode active material.

15. An electric vehicle comprising the battery pack of claim 1.

16. The method of claim 5, further comprising heating the flexible electronically conductive tab with a laser.

17. The method of claim 16, wherein the thermally joining comprises positioning an optical discharge from the laser through the aperture to heat the flexible electronically conductive tab.

18. The method of claim 5, wherein the thermally joining includes at least one selected from the group of brazing, welding, and/or soldering.

19. The method of claim 5, wherein the thermally joining includes welding.

20. The method of claim 5, wherein the clamping fixture is not thermally joined to either the flexible electronically conductive tab or the PCB during the method.

\* \* \* \* \*